US009694977B2

(12) United States Patent
Aprea et al.

(10) Patent No.: US 9,694,977 B2
(45) Date of Patent: Jul. 4, 2017

(54) STORAGE MATERIAL HANDLING SYSTEM

(71) Applicant: NEXTSHIFT ROBOTICS, INC., Andover, MA (US)

(72) Inventors: Matthew Aprea, Wellesley, MA (US); Charles Grinnell, Arlington, MA (US); Joe Jones, Acton, MA (US); John Kawola, Sudbury, MA (US); Mary Ellen Sparrow, Andover, MA (US); Stephen C. Toebes, Chelmsford, MA (US); Clara Vu, Cambridge, MA (US)

(73) Assignee: NEXTSHIFT ROBOTICS, INC., Andover, MA (US)

( * ) Notice: Subject to any disclaimer, the term of this patent is extended or adjusted under 35 U.S.C. 154(b) by 0 days.

(21) Appl. No.: 14/883,310

(22) Filed: Oct. 14, 2015

(65) Prior Publication Data

US 2016/0101940 A1  Apr. 14, 2016

Related U.S. Application Data

(60) Provisional application No. 62/063,825, filed on Oct. 14, 2014.

(51) Int. Cl.
*G06F 7/00* (2006.01)
*B65G 1/137* (2006.01)
(Continued)

(52) U.S. Cl.
CPC .......... *B65G 1/1373* (2013.01); *B25J 9/1679* (2013.01); *G05D 1/0297* (2013.01);
(Continued)

(58) Field of Classification Search
None
See application file for complete search history.

(56) References Cited

U.S. PATENT DOCUMENTS 4,678,390 A   7/1987 Bonneton et al.
6,950,722 B2  9/2005 Mountz
(Continued)

FOREIGN PATENT DOCUMENTS

EP      2724202       4/2014
WO   2012178048      12/2012
(Continued)

OTHER PUBLICATIONS

International Search Report, International Application No. PCT/US2015/055572, dated Feb. 2, 2016.

*Primary Examiner* — Yolanda Cumbess
(74) *Attorney, Agent, or Firm* — Perman & Green, LLP

(57) ABSTRACT

A storage fill and retrieval system includes fixed storage locations distributed in a storage space and defining at least one human pick zone having at least one collection tote location, at least one autonomous mobile robot configured for holding and transporting a tote within the storage space and having an end effector arranged for autonomous transfer of the tote between the at least one robot and a tote holding station and a collection tote location, and a storage management system communicably connected to the at least one robot and configured to associate each robot with a human pick zone, wherein the at least one robot is configured to transport the tote to the collection tote location of each associated human pick zone, and wherein each collection tote location is arranged for human picker access and defines an interface between a human picker and the at least one robot.

43 Claims, 22 Drawing Sheets

(51) Int. Cl.
  *B25J 9/16* (2006.01)
  *G06Q 10/08* (2012.01)
  *G05D 1/02* (2006.01)

(52) U.S. Cl.
  CPC ... *G06Q 10/087* (2013.01); *G05D 2201/0216* (2013.01); *Y10S 901/01* (2013.01); *Y10S 901/49* (2013.01)

(56) References Cited

U.S. PATENT DOCUMENTS

| | | |
|---|---|---|
| 7,894,939 B2 | 2/2011 | Zini et al. |
| 7,996,109 B2 | 8/2011 | Zini et al. |
| 8,010,230 B2 | 8/2011 | Zini et al. |
| 8,204,624 B2 | 6/2012 | Zini et al. |
| 8,606,392 B2 | 12/2013 | Wurman et al. |
| 8,930,127 B2 | 1/2015 | Shimshoni et al. |
| 2009/0185884 A1 | 7/2009 | Wurman et al. |
| 2012/0330458 A1 | 12/2012 | Weiss |
| 2013/0317642 A1* | 11/2013 | Asaria ............... G06Q 50/28 700/216 |
| 2014/0100998 A1 | 4/2014 | Mountz et al. |
| 2014/0288696 A1* | 9/2014 | Lert ............... B65G 1/0492 700/216 |

FOREIGN PATENT DOCUMENTS

| | | |
|---|---|---|
| WO | 2013112907 | 8/2013 |
| WO | 2013119942 | 8/2013 |

\* cited by examiner

STORAGE MATERIAL HANDLING SYSTEM

CROSS REFERENCE TO RELATED APPLICATIONS

This application is a non-provisional of and claims the benefit of U.S. provisional patent application No. 62/063,825, filed on Oct. 14, 2014, the disclosure of which is incorporated by reference herein in its entirety.

BACKGROUND

1. Field

The exemplary embodiments generally relate to storage and retrieval of goods, more particularly, to the automated storage and retrieval of goods.

2. Brief Description of Related Developments

Generally in manual order distribution centers, human pickers generally walk aisles of the distribution center with a pick sheet listing all items that are needed to fulfill particular orders. The pick sheet is generally generated by a central control system based on the orders received and is often optimized in some way to minimize the amount of time it takes to retrieve all of the items on the sheet. After one or several orders have been picked from the storage aisles, the picker(s) brings the completed orders to a packaging station where the items are transferred from, for example, totes into shipping cartons.

Automated distribution center picking systems are utilized to save time and decrease costs associated with manual picking of goods. However, these automated distribution center picking systems generally require customized rack and shelving structures to accommodate a robotic picking system, or conveyors and sorters to aid human picking. These automated distribution center picking systems are cost prohibitive to many distribution centers and require a significant investment in both capital and time, which is typically on the order of months or over a year for full installation and system integration to be completed. In addition, changes to the automated distribution center picking systems can be costly as expansion of the automated systems is disruptive and contraction of the system yields under-utilization of system resources or additional disruptive changes.

It would be advantageous to have a material handling and storage system that is flexible and adaptive to customer needs and that addresses the issues noted above.

BRIEF DESCRIPTION OF THE DRAWINGS

The foregoing aspects and other features of the disclosed embodiment are explained in the following description, taken in connection with the accompanying drawings, wherein.

DETAILED DESCRIPTION

Figure 1:
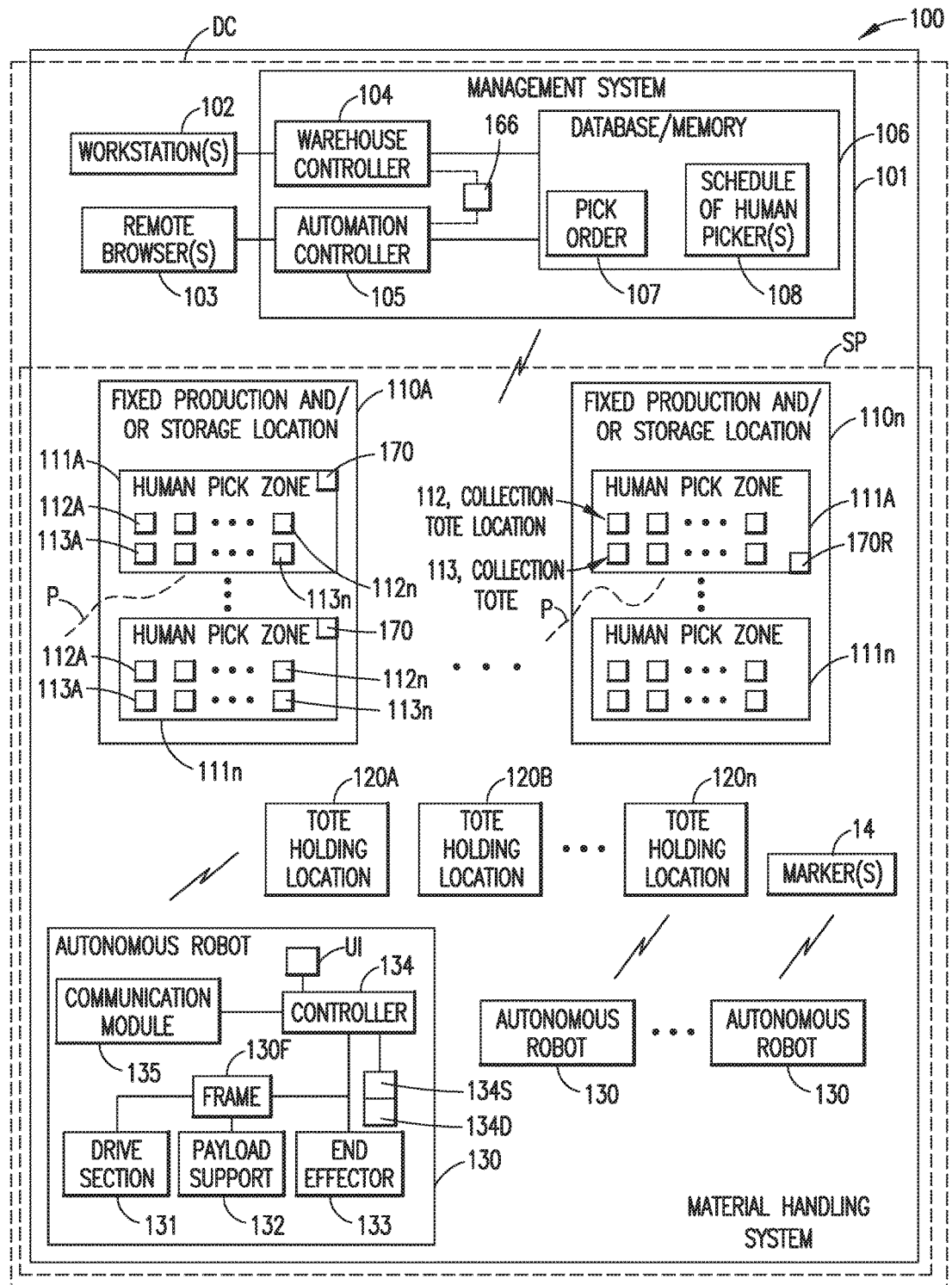
FIG. 1 is a schematic block diagram of a material handling system in accordance with aspects of the disclosed embodiment.

FIG. 1 illustrates a schematic block diagram of a material handling system 100 in accordance with aspects of the disclosed embodiment. Although the aspects of the disclosed embodiment will be described with reference to the drawings, it should be understood that the aspects of the disclosed embodiment can be embodied in many forms. In addition, any suitable size, shape or type of elements or materials could be used.

The material handling system 100, in accordance with the aspects of the disclosed embodiment, provides a system for automated material handling in industrial applications wherein at least a portion of the industrial facility employs human pickers to effect material transport and/or selection from an initial source locations to a final destination located remotely from the initial source location. Examples of such industrial applications include manufacturing facilities, manufacturing centers, warehouse/distributions centers, retail stores, in-process product transport and any other suitable industrial application where goods are produced, manufactured, stored and/or transferred. In one aspect, the material handling system provides for the automated order fulfillment, replenishment and/or returns in, for example, a warehouse/distribution center DC (referred to herein as distribution center DC) substantially without changes of the physical infrastructure of the distribution center DC and/or industrial facility. In one aspect, as will be described in greater detail below, the aspects of the disclosed embodiment allow for the deployment of an automated order fulfillment system (including managing and controlling the movement of resources within the automated order fulfillment system) at a fraction of the cost of a majority of conventional automated fulfillment systems, and at a fraction of the install and integration time resulting in a system that is flexible and adaptive to customer needs. The aspects of the disclosed embodiment include, as will be described below, one or more autonomous mobile robots working/comingling with one or more human pickers distributed in pick zones of, or in product storage racks to fill orders in a predetermined order pick sequence where an autonomous aspect of the robots 130 allows for staging and sorting of orders to be done in a variety of places within the facility, allowing for greater system flexibility.

As will be seen from the description below, the aspects of the disclosed embodiment are robust to inaccuracies in its projections of system progress such as robot(s) 130 and picker(s) 170 completing actions slower or faster than predicted. Inaccuracies in projections of speed can yield a reduction of system efficiency such as traffic jams, autonomous mobile robots waiting for human pickers and/or human pickers waiting for autonomous mobile robots which can be alleviated by, for example, the management system 101 in the manner described herein such as by adjusting the schedule and path of each element of the material handling system 100 to avoid traffic jams with a goal of minimizing the time to order fulfillment. As may be realized, the material handling system 100 described herein can be deployed on a single level or can access multiple levels in a distribution center DC by navigating (e.g. the robots 130 and/or items carried by the robots 130 may negotiate the levels) any suitable ramps or lifts connecting the different levels of the distribution center DC.

As can be seen in FIG. 1, the material handling system 100 includes a management system 101, one or more fixed production and/or storage locations 110A-110n (e.g. racks in a distribution center DC), one or more tote holding locations 120A-120n, one or more collection tote locations 112A-112n (which in one aspect are/may be located at an ergonomic height for human picker access) and one or more autonomous mobile robots 130 (referred to herein as robots 130). The management system 101 is any suitable distribution center DC management system that interfaces with one or more workstations 102 and/or remote browsers 130 for obtaining and updating customer orders. The management system 101, in one aspect, also controls the movement and storage of materials within the warehouse/distribution center and processes the associated transactions, including shipping, receiving, placement of items in storage and picking. The management system 101 includes any suitable components such as for example, a warehouse controller 104, an automation controller 105 and one or more database/memory 106. The warehouse controller 104, in one aspect, directs the real-time activities within the distribution center DC. The automation controller 105, in one aspect, provides tote picking and placing commands to the robots 130 for fulfilling customer orders and/or replenishment of items within the distribution center DC. The one or more database/memory 106 includes a pick order 107 associated with each customer order (or a number of customer orders where the orders are batch picked) and a schedule of human pickers 108 associated with one or more customer orders. One or more of the pick order 107 and schedule of human pickers 108 defines the predetermined order pick sequence. For example, the management system 101 determines an optimum sequence for the one or more autonomous mobile robots 130 and pickers 170 to fill orders so as to minimize an amount of time necessary to fill an order based on any suitable criteria such as that described below. In one aspect, the management system 101 includes a material handling robot traffic controller and scheduler 166 (which in one aspect is part of one or more of the warehouse controller 104 and the automation controller 105) that substantially knows where all of robots 130 are. In one aspect, the material handling robot traffic controller and scheduler 166 substantially knows where all of robots 130 and the pickers are. In another aspect, the material handling robot traffic controller and scheduler 166 substantially knows where all of robots 130, the pickers and other vehicles, such as human or robotically operated fork lifts/fork trucks are. The material handling robot traffic controller and scheduler 166 is, in one aspect, optimized for the material handling system 100 where the robot 130 and the picker 170 operations are coupled (e.g. where the robot waits for the picker or vice versa in order to complete a transaction). In this aspect the material handling system 100 schedules actions to minimize wait time, with a goal of minimizing overall order fulfillment time. In another aspect the material handling robot traffic controller and scheduler is optimized for the material handling system 100 where the robot 130 and the picker 130 operations are de-coupled via a tote that both the picker 170 and robot 130 have independent access to. In this aspect the robot 130 does not wait for the picker 170 and vice versa in order to complete a transaction. In this aspect, for example, the management system 101 schedules actions of the picker 170 independent of, but in coordination with the robot 130 and avoids congestion in the aisle-ways with a goal of minimizing overall order fulfillment time. In another aspect, the picker 170 is not scheduled at all, but rather just attends to robots 130 (that are e.g., scheduled for transporting items) that are waiting for human interaction, such as a pick action, at any point in the warehouse.

Figure 2:
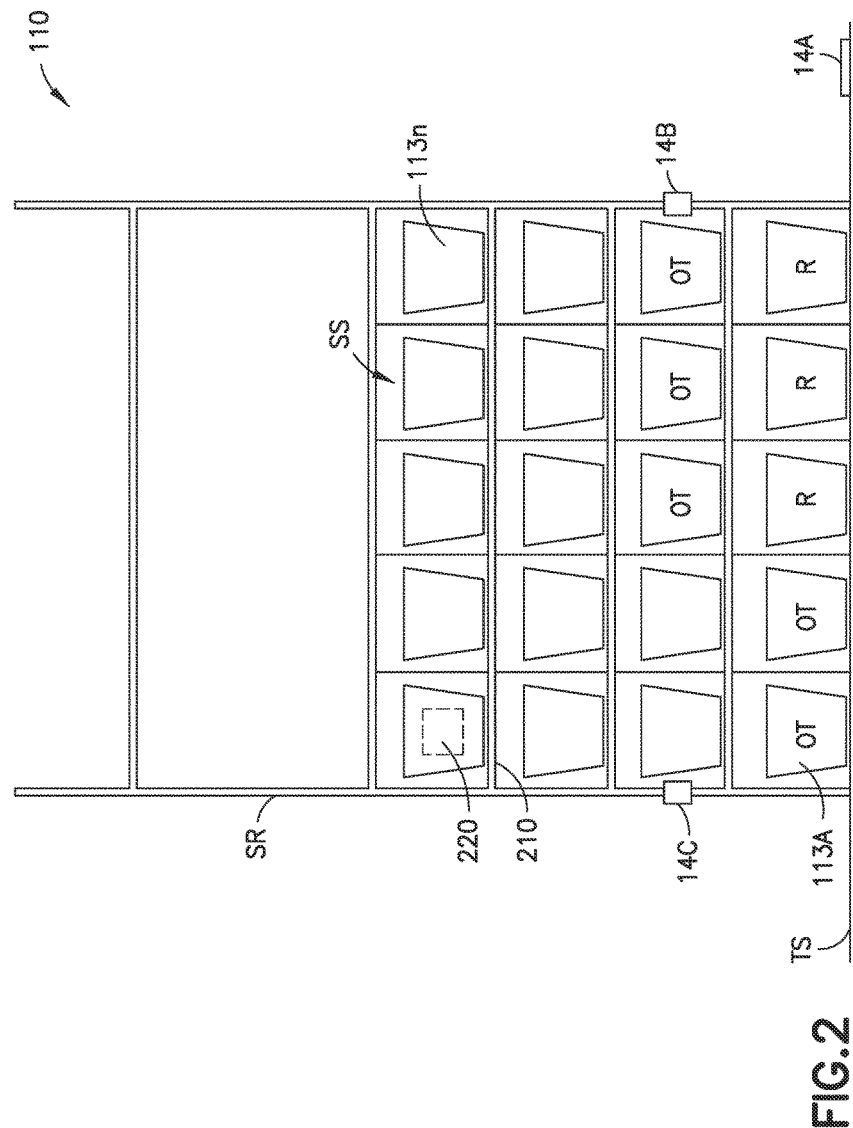
FIG. 2 is a schematic illustration of a portion of the material handling system of FIG. 1 in accordance with aspects of the disclosed embodiment.

The one or more fixed production and/or storage locations 110A-110n are distributed in a storage space SP of the distribution center DC in a predetermined ordered configuration. Referring also to FIG. 2, each of the one or more fixed production and/or storage locations 110A-110n includes storage racks SR having an array of storage spaces SS on which stored items 220 are located. In one aspect, the stored items 220 are stored in totes (which, in one aspect, are substantially similar to order or collection totes 113A-113n) or any other suitable container located in the array of storage spaces SS. Each of the one or more fixed production and/or storage locations 110A-110n includes at least one human pick zone 111A-111n. As described herein, pickers 170 are stationed in respective human pick zones 111A-111n such that one or more pickers 170 stationed in a respective human pick zone 111A-111n is responsible for all picking operations within that human pick zone 111A-111n. The human pick zone 111A-111n, in one aspect, are dynamically variable and are defined by the material handling robot traffic controller and scheduler 166 or any other suitable component of the management system 101 and describes an area which is flexible and adaptable as determined by the needs of the distribution facility DC and the orders that are to be processed at any given time. In one aspect the human pick zones 111A-111n are dynamically defined so as to change in size, shape and location depending on, for example, items to be picked, a number of human pickers 170 available, and/or any other suitable criteria. In one aspect, the human pick zones 111A-111n are dynamically variable depending on, for example, a location at which a stored item is to be picked from storage, a location of a robot traverse route, and/or a location of a human picker 170. For example, as described herein, the management system 101 knows or otherwise tracks a location of the pickers 170 and/or the robots 130.

Figure 4:
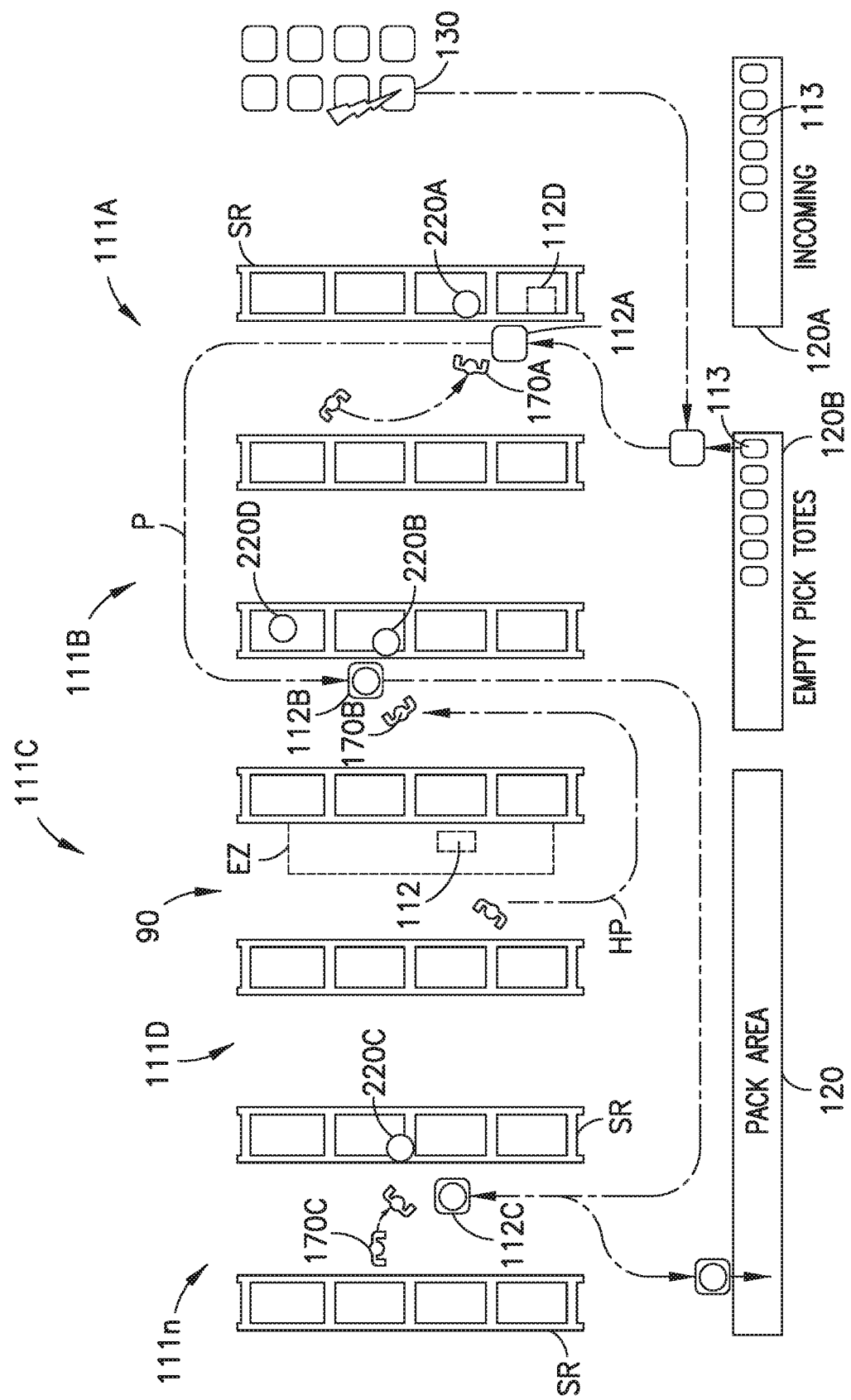
FIG. 4 is a schematic illustration of a portion of the material handling system of FIG. 1 in accordance with aspects of the disclosed embodiment.
Figure 19:
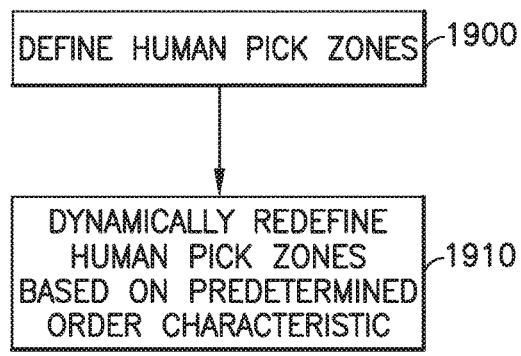
FIG. 19 is a flow diagram of dynamically changing human pick zones in accordance with aspects of the disclosed embodiment.

Referring to FIGS. 4 and 19, in one aspect the human pick zones 111A-111n are defined so that picker 170A is originally assigned to human pick zone including human pick zones 111A and 111B, picker 170B is originally assigned to human pick zones including human pick zones 111C and 111D, and picker 170C is originally assigned to human pick zones including human pick zones 111n (FIG. 19, Block 1900). As orders are fulfilled the pickers move from one area of their assigned pick zone to other areas of their assigned pick zone such that, in one aspect, it is inefficient for a picker to traverse an entire respective pick zone to pick an item when another picker is located closer to the item to be picked. For example, picker 170A moves to collection tote location 112A to pick stored item 220A while another order calls for the picking of stored item 220D at or about the time picker A is scheduled to pick item 220A. The management system 101 is configured to dynamically redefine (which includes relocating/resizing/reassigning) the human pick zone for picker 170B, (which is located at for example, collection tote location 112B) to include human pick zone 111B in which stored item 220D is located (FIG. 19, Block 1910). As may be realized, while the previous example, of dynamically changing the human pick zones is based on a proximity of a picker relative to a stored item to be picked, in other aspects the human pick zones 111A-111n are resized and relocated based on any suitable predetermined characteristics of an order which include, but are not limited to, an availability of a picker 170, an availability of a robot 130, availability of stored items, or any other suitable order characteristics.

Figure 3A:
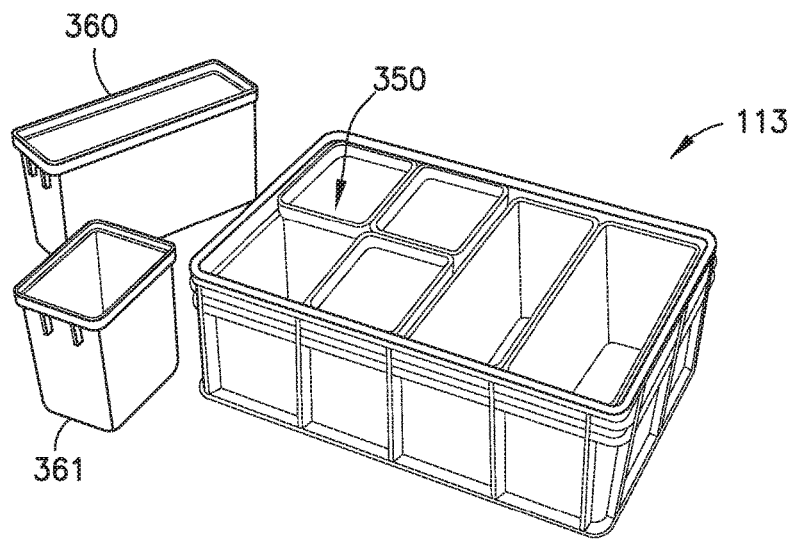
FIGS. 3A-3C are schematic illustrations of a tote in accordance with aspects of the disclosed embodiment.
Figure 3B:
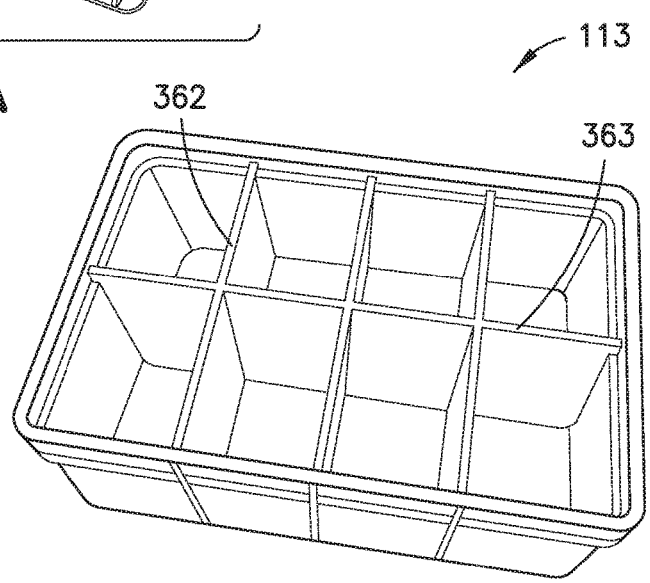
Figure 3C:
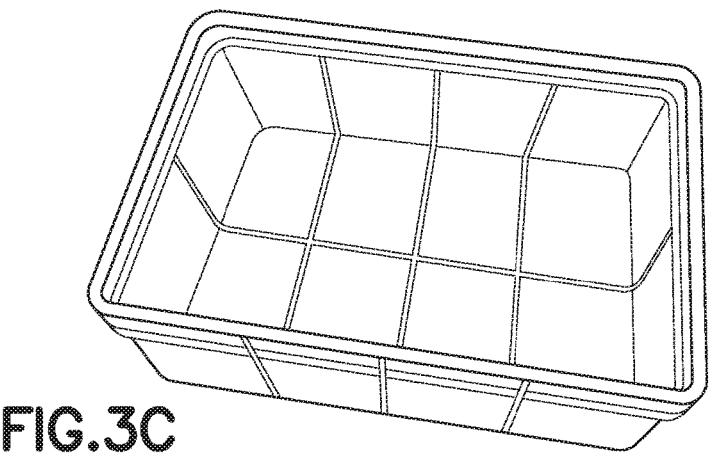

Each of the at least one human pick zone 111A-111n is arranged for human picker access to pick or place items from the fixed production and/or storage locations 110A-110n which are arrayed in the at least one human pick zone 111A-111n. Each of the at least one human pick zone 111A-111n includes at least one collection tote station or location 112A-112n in which one or more collection totes are located to receive picked stored items from human picker(s) 170. The one or more collection totes (an example of which is illustrated in FIGS. 3A-3C) is configured to receive or will receive articles inbound to the fixed production and/or storage locations 110A-110n, hold a collection of articles, and/or become a collection of articles. The one or more collection totes are, in one aspect, any suitable container/tote associated with a store/customer order and/or a replenishment order of the distribution center/industrial facility. In one aspect the collection tote location is one or more of an aisle collection location (see locations 112A-112C in FIG. 4), a rack collection location (see location 112D in FIG. 4), a payload support 132 of the robot 130 and any other suitable place configured to hold a tote. In one aspect, the collection tote locations 112A-112n are dynamically variable according to, for example, a predetermined characteristic of an order where the predetermined characteristic of the order is, for example, a location of a stored item, a location of a picker 170, a location of a robot 130, a path or traverse route P of a robot, a quantity of an item, or any other suitable characteristic of the order. The location of the collection tote locations 112A-112n, based on the predetermined characteristic of the order is communicated to one or more of the robot 130 and picker 170 by, for example, the management system 101 in any suitable manner. As may be realized, in one aspect, there are more than one collection tote location 112A-112n within a common human pick zone 111A-111n.

Figure 21:
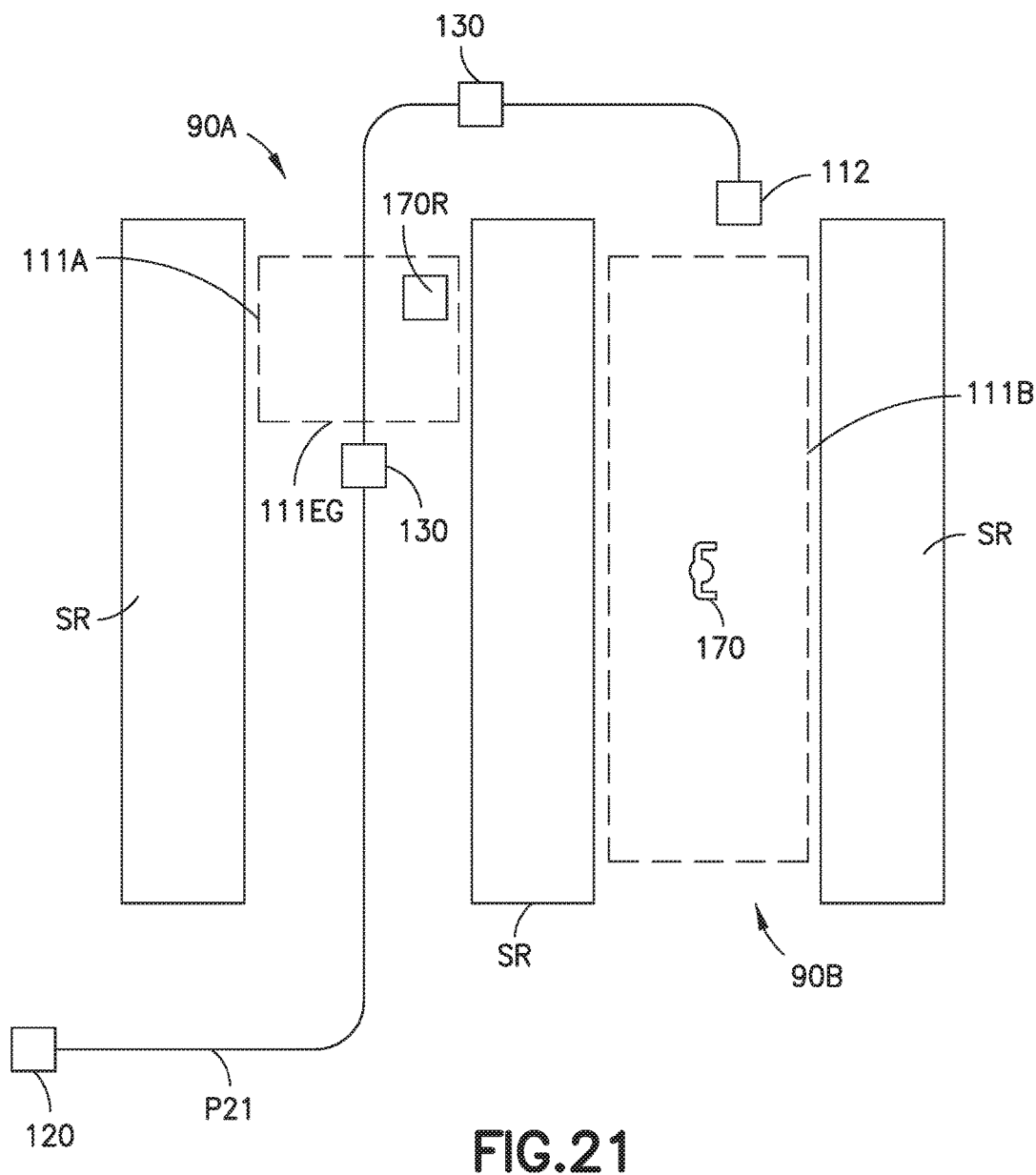
FIG. 21 is a schematic illustration of a portion of the material handling system of FIG. 1 in accordance with aspects of the disclosed embodiment.

In one aspect each of the human pick zones 111A-111n are integrally coupled to at least one collection tote location 112A-112n located proximate to each of the human pick zones 111A-111n. It should be understood that while the pickers 170 are described herein as being human pickers in other aspects the pickers 170 are robotic pickers 170R communicably connected to the management system 101 (FIGS. 1 and 21). In one aspect, the material handling system 100 includes both human pickers 170 and robotic pickers 170R where the human pickers 170 and/or robotic pickers 170R pick alone or in combination with each other in the pick zones. In one aspect, the robotic pickers 170R may be the robots 130 or other robotic vehicles, and/or manipulators, with suitable structure, such as robotic manipulators configured to pick items from storage and place the items in collection totes at collection tote locations and/or in collection totes carried by other robots 130 in a manner substantially similar to that described herein with respect to human pickers 170. In other aspects, the robotic picker 170R places the items picked from storage in a collection tote carried by the robotic picker 170R for transfer to any suitable location within the material handling system 100, such as a collection tote location or a packing workstation. The robotic pickers 170R may mix and/or interface, within a pick zone or in different pick zones (e.g. some pick zones are human pick zones while other pick zones are robotic picker pick zones where the robotic picker pick zones may be adjacent human pick zones, and/or other pick zones are mixed pick zones having both human pickers 170 and robotic pickers 170R) with human pickers 170 in a coupled or uncoupled manner substantially similar to that described herein with respect to robots 130 while in other aspects the management system 101 is configured to change a status of a human pick zone to a robotic picker pick zone effecting operation of the robotic picker in a respective pick zone. In one aspect, the human pickers 170 and/or robotic pickers 170R are dispatched and/or located at various locations within the distribution center DC such as for example, within one or more of the human picking zones 110A-110n. Based on, for example, the orders received, the management system 101 informs the human pickers 170 in any suitable manner (e.g. aural communication and/or visual communication) of a list of stored items 220 to pick. The picking of these stored items 220 may also be an ordered pick according to a sequenced pick order 107 so as to correspond with a location of one or more robots 130 as described below. The human pickers 170 pick the identified stored items and place them in, for example, a tote 113 disposed at a collection tote location 112A-112n.

The one or more robot 130 works with or otherwise comingles with one or more human picker 170. In accordance with other aspects of the material handling system 100, the robot(s) 130 and human pickers 170 may be decoupled as will be described below. Further, for example, decoupling there between may be such that there is minimum or no comingling of robot(s) 130 and human pickers 170, though both the robot(s) 130 and human pickers 170 may share the storage and/or picking space. Each robot 130 includes a frame 130F forming a payload support 132. The payload support is configured to support or otherwise hold, for example, a tote or other suitable container 113 (FIGS. 3A-3C) which in one aspect is substantially similar to the totes 113A-113n. Each robot 130 includes an end effector 133 connected to the frame 130F and configured to transfer one or more totes 113 between the payload support 132 and any suitable location such as the collection tote location 112A-112n, the storage spaces SS and/or a tote holding station or location 120A, 120B . . . 120n (such as a tote storage location, a pack and ship area/order fulfillment collection zone or any other location where a tote is held) as will be described below. The end effector 133 has one or more degrees of freedom and in one aspect the end effector has two degrees of freedom such as for example, vertical movement and at least translation along one horizontal axis for transferring a tote to and from the robot 130. In other aspects the end effector has three degrees of freedom such as, for example, vertical movement and translation along two substantially orthogonal horizontal axes (fore/aft or side to side relative to a robot frame of reference) for transferring a tote to and from the robot 130. A drive section 131 is connected to the frame 130F and is configured to effect movement of the robot 130 through the distribution center DC, as described herein, and to effect operation of the end effector for transferring totes 113 to and from the payload support 132. A controller 134 is connected to the frame 130F for controlling operation of the robot 130 as described herein while a communication module 135 provides communication between the controller 134 and, for example, the automation controller 105 or any other suitable component of the management system 101. In one aspect the robot 130 includes a user interface UI connected to the controller 134 to convey, for example, picking instructions or any other suitable information to a picker 170 as described below.

In one aspect the controller 105 of the robot 130 includes any suitable navigation and mapping and/or obstacle avoidance to allow the robot 130 to move throughout the distribution center DC. Examples of suitable navigation and mapping and/or obstacle avoidance are found in U.S. patent application Ser. No. 13/285,511 filed Oct. 31, 2011 and entitled "Methods and Systems for Automated Transportation of Items between Variable Endpoints" (now U.S. Pat. No. 9,147,173 issued on Sep. 29, 2015), the disclosure of which is incorporated by reference herein in its entirety. In one aspect the robot 130 includes any suitable sensors 134S for detecting any suitable guidance markers/beacons 14 (referred to herein as markers 14) located throughout the distribution center DC. Referring to FIG. 2, in one aspect the markers 14 are located on one or more of a robot travel surface TS (see marker 14A) of the distribution center DC (e.g. where the travel surface TS is a floor or a travel surface elevated above the floor), a rack SR (see markers 14B, 14C) of the one or more fixed production and/or storage locations 110A-110n and any other suitable location of the distribution center DC. In one aspect the markers 14 are optical, capacitive, inductive or any other suitable markers that are detected with the sensors 134S of the robot (which include one or more of an optical sensor, capacitive sensor and inductive sensor).

Where the marker 14 is an optical marker, the marker is an active marker (e.g. an optical emitter) or a passive marker (e.g. a pattern recognized by, for example, a camera or other sensor of the robot). As may be realized, the optical markers provide a line of sight robot navigation such that the robot moves from one marker to another marker and/or follows a line on, for example, the travel surface TS in a point to point navigation scheme unless an obstacle is encountered.

In other aspects, one or more of the markers 14 establish a coordinate system such that the controller 134 of the robot 130 effects navigation of the robot 130 based on a location of the marker 14 (e.g. the origin of the coordinate system) and data provided by one or more encoders of, for example, the drive section 131. Subsequent markers located throughout the distribution center DC, in one aspect, effect a verification/recalibration of robot 130 location to account for wheel slip or other odometry inaccuracies.

In other aspects the marker 14 is a radio frequency marker that transmits any suitable radio frequency that is detected by the sensors 134S (which in one aspect includes a radio receiver). As may be realized, the controller 134 is configured to determine a location of the robot 130 within the distribution center DC relative to, for example, one or more of the fixed production and/or storage locations 110A-110n and tote holding locations 120A-120n based on signals received from and/or the detection of the markers 14.

In still other aspects, the controller 134 includes a coordinate map of the distribution center DC (e.g. a simultaneous location and mapping navigation system) so that navigation of the robot 130 is based on a global coordinate reference frame of the distribution center (e.g. the global coordinates can be utilized independent of and/or in conjunction with the markers 14).

In one aspect the robot 130 includes an obstacle detection system 134D connected to the controller 134 for detecting any obstacles such as, for example, inanimate objects, other robots 130 and/or human pickers 170. In one aspect the obstacle avoidance system 134D includes one or more range sensors, or other suitable sensors, to detect the inanimate objects, other robots 130 and/or human pickers 170. The controller 134 is configured to change/modify a route or path of travel of the robot 130 based on the detection of one or more obstacles so that the robot 130 completes task (e.g. picking and/or placing of totes and/or replenishment of stored items, etc.) assigned to the robot. In one aspect, human pickers 170 and/or other equipment of the material handling system 100 may be outfitted with one or more of transponders, reflectors, or other passive or active signaling devices that are configured to indicate to the robot 130 what the obstacle wearing the signaling device, or to which the signaling device is affixed, is (e.g. a human picker, a storage rack, a tote holding location, a fork lift or other vehicle, etc.). The robot 130 may be configured to perform different transactional behaviors depending on the type of obstacle the robot 130 encounters.

As may be realized, the management system 101 (or any suitable component thereof such as, for example, the automation controller 105) knows, through communication with the robots 130 where each of the robots 130 are located within the distribution center DC. The management system also knows, in one aspect, where the human pickers 170 are (e.g. based on for example the schedule of human pickers 108). In another aspect, the management system knows where the pickers 170 and other material handling system 100 equipment are located based on, for example, any suitable sensors or devices (such as those described herein) located on the picker 170 and/or equipment that can be used to calculate their position within the distribution center DC. Accordingly, the management system coordinates comingling of the human pickers 170 and the robots 130 based on, for example, orders to be fulfilled while allowing the robots to avoid direct contact with the human pickers.

Figure 20:
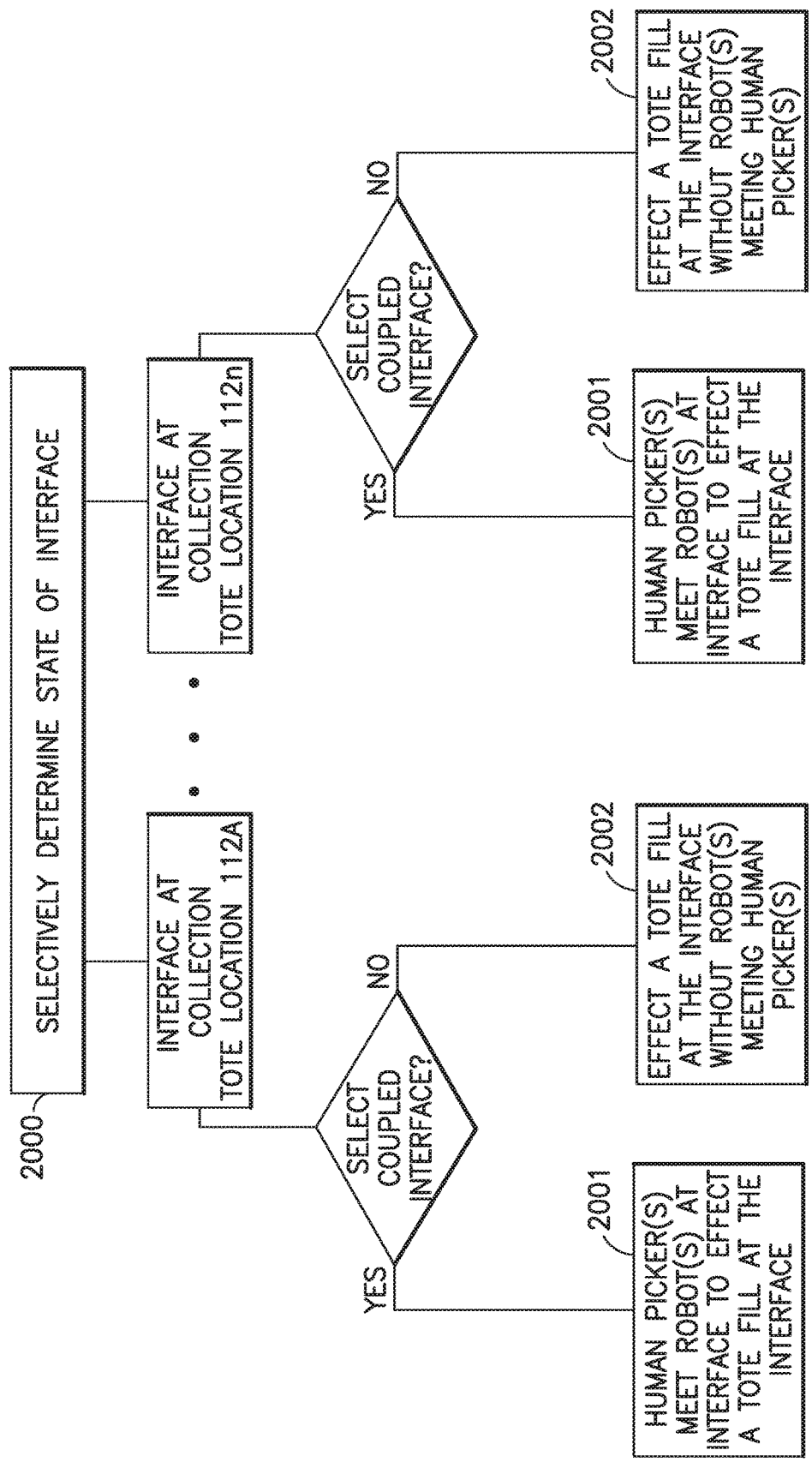
FIG. 20 is a flow diagram of a picker/robot interface state determination in accordance with aspects of the disclosed embodiment.

In one aspect, the management system 101 includes a controller, such as automation controller 105 and/or warehouse controller 104, that is in communication with the human pickers 170 and the robots 130. The management system 101 (and its controller(s)) is configured so that the management system generates an interface (e.g. a location where a transaction between the pickers 170 and robots 130 occurs directly or indirectly) between the human pickers 170 and the robots 130 in the human pick zones 111A-111n. The management system 101 (and its controller(s)) is also configured to dynamically selectively determine whether a state of the interface is to be a coupled interface or a decoupled interface (FIG. 20, Block 2000). In one aspect, the determination of the state of the interface is based on, for example, a proximity of a robot 130 or picker 170 from a collection tote location 112, a proximity of a robot 130 relative to a picker 170, a number of pickers 170 versus a number of robots 130 in the material handling system 100 or any other suitable factors that may influence an efficiency of the material handling system 100. For example, when the management system 101 selectively determines that the state of the interface is to be a coupled interface, the human picker 170 meets the robot(s) 130 at, for example, a collection tote location 112, effecting a tote fill at the collection tote location 112 (FIG. 20, Block 2001) as described herein. When, for example, the management system 101 determines that the state of the interface is to be a decoupled interface, the human picker 170 does not meet the robot(s) 130 at, for example, the collection tote location 112, and the tote fill is effected at the collection tote location 112 without a human picker(s) meeting the robot(s) 130 (FIG. 20, Block 2001) as described herein.

Referring to, for example, FIGS. 4 and 9-11 where there are multiple collection tote locations 112A-112n the management system 101 may dynamically determine whether each collection tote location 112A-112n is to be in a coupled or decoupled state based on, for example, the factors described above (e.g. such as a proximity of a robot 130 or picker 170 from a collection tote location 112, a proximity of a robot 130 relative to a picker 170, a number of pickers 170 versus a number of robots 130 in the material handling system 100 or any other suitable factors). For exemplary purposes only, for any given tote fill, a first collection tote location, such as location 112A in FIGS. 4 and 9-11 may be in an uncoupled state (e.g. a robot 130 picks the collection tote 113 at a collection tote location where the human picker 170 has provided a pick). The robot 130 (or another robot 130) moves to a second collection tote location 112B where the management system 101 selects a coupled interface between the robot 130 and human picker 170 where the human picker 170 meets the robot 130 and places a picked item in the collection tote 113 carried by the robot 130. The robot 130 (or anther robot 130) may move to another collection tote location 112C which is selected by the management system 101 to be in a coupled or decoupled state.

In accordance with aspects of the disclosed embodiment, the robots 130 are dispatched by, for example, the management system 101 to one or more collection tote locations 112A-112n of the one or more fixed production and/or storage locations 110A-110n for, at least in part, fulfilling a customer order. In one aspect the robots 130 are dispatched carrying a tote 113 or without carrying a tote 113 as will be seen in the exemplary operations of the material handling system 100 described below. In one aspect, if a robot 130 is dispatched without carrying a tote 113 the robot is instructed to pick up an empty tote 113 from any suitable location and then proceed to a collection tote location 112A-112n, where the robot either picks up a tote 113 already containing a stored item that was pre-picked by the picker 170, or a picker 170 deposits a stored item into the tote 113 that the robot 130 is carrying. In other aspects, as described below, the robot 130 deposits the tote 113 at any of the collection tote locations 112A-112n so that the robot 130 actions are decoupled from the picker 170 actions (e.g. the picker 170 does not wait for the robot 130 and the robot 130 does not wait for the picker 170, this may be referred to as "decoupled" operation of the robot 130 and picker 170). As may be realized, the decoupling of the robot from the picker greatly alleviates the scheduling task requirements of the management system 101.

Referring now to FIGS. 1 and 4, one or more paths P are formed within the human pick zones 111A-111n in the storage space SP, along which the robots 130 transport tote(s). The one or more paths P connect the tote collection locations 112A-112D that correspond to a pick order 107 and in which the pickers pick and place items from storage. The paths are formed in any suitable manner, such as by the management system 101 and are, in one aspect, modified by the robots 130 such as when an obstacle is encountered along the path P. In one aspect, the pickers are dispatched and/or located at various predetermined locations within the distribution center. In one aspect the pickers stay in and around the respective predetermined locations in a "zone picking" function where one or more pickers are assigned to a human picking zone 111A-111n. In one aspect a robot 130 travels along the one or more paths P and collects stored items 220A-220C for one order at a time (according to a pick order 170) and brings the order to a tote holding location 120C such as a pack and ship area or order fulfillment collection zone. The management system 101 calculates an optimum or non-optimum travel path P for the robots 130 and an optimum or non-optimum sequence of operations for both the pickers 170 and the robots 130 based, for example, on one or more of a facility map, orders received, the location of stored items to be retrieved, the quantity of stored items to be retrieved, the urgency/priority of items to be retrieved, the number of pickers 170 available, the quantity of items that can fit in a tote, the quantity of orders that can fit into a multi-order tote, the number of robots 130 available, robot travel velocity within various predetermined portions of the distribution center DC, average picker velocity within various predetermined portions of the distribution center DC, average picker/robot interaction time and the aisle ways available for robot and picker travel. The management system 101, in one aspect, predicts, using a map of the distribution center DC, picker and robot traffic congestion spots and adjusts robot paths P (and/or human picker paths HP) to avoid the anticipated congestion points. It is noted that the human picker paths HP are generated in, one aspect, in a manner substantially similar to that described herein with respect to the robot paths P. In one aspect a resource density map is generated by the management system 101 where the resource density map (the granularity of which is adjusted as needed) illustrates or otherwise indicates the density of distribution center resources at any suitable predetermined points in time. The management system 101 limits the order density, based on the resource density map, to a level that assures that robots 130 (that operate with heuristics as described above) navigate their way out of traffic jams and potentially avoid traffic jams altogether.

Figure 5:
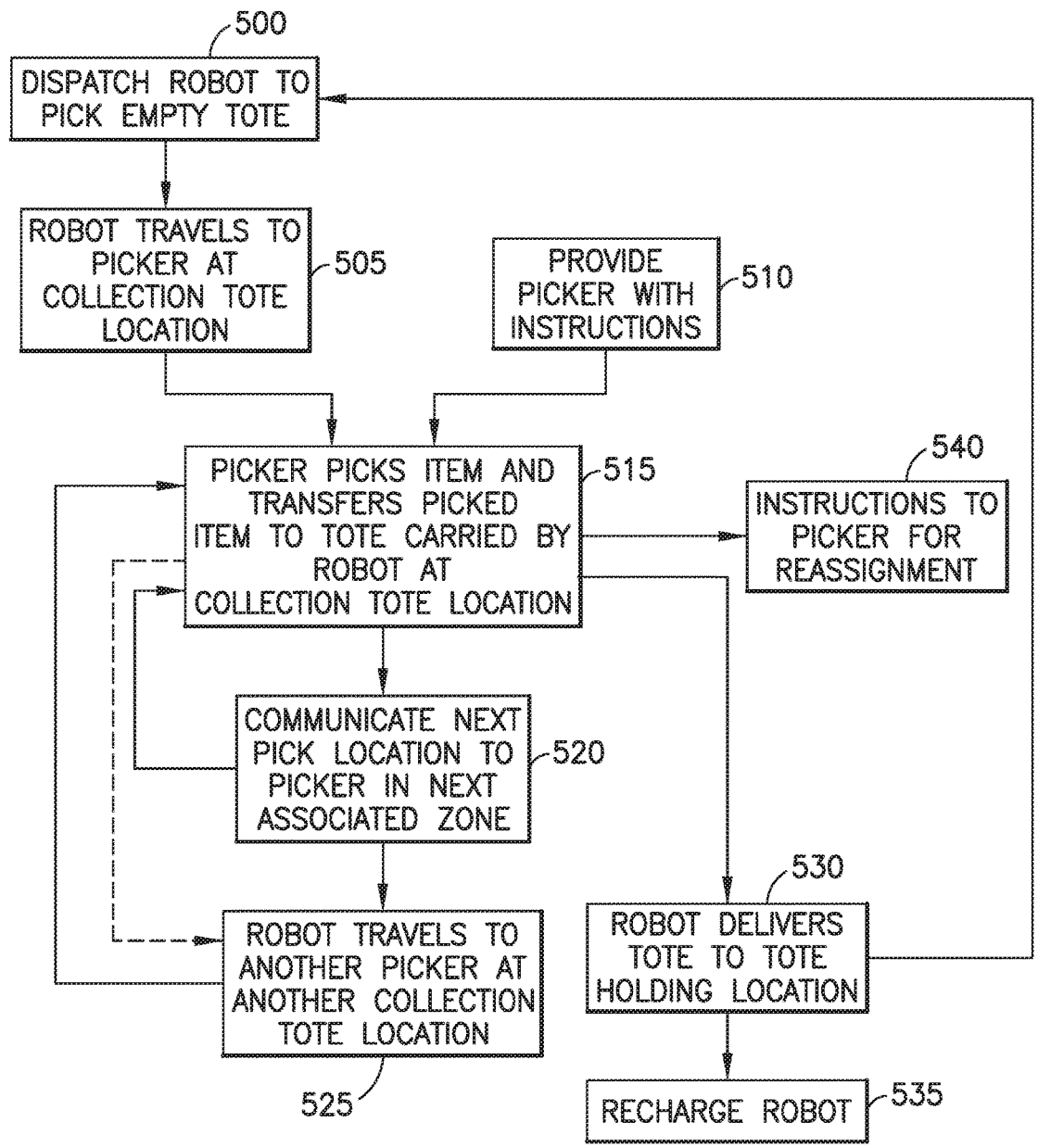
FIGS. 5-8 are order fulfillment flow diagrams in accordance with aspects of the disclosed embodiment.

For example, the management system 101 provides instructions to a robot 130 so the robot 130 is dispatched to pick an empty tote 113 from any suitable tote holding location 120B (FIG. 5, Block 500). In other aspects, the robot 130 is dispatched already holding a tote 113. The robot 130, carrying the tote 113 travels to a predetermined location, such as collection tote location 112A (FIG. 5, Block 505). The management system 101 provides a picker 170A with picking instructions that indicate a location (e.g. collection tote location 112A) to which the picker is to transfer a stored item to the tote 113 (FIG. 5, Block 510). With the picker 170A and robot 130 both at the collection tote location 112A, the picker 170A picks the stored item 220A and transfers the stored item 220A to the tote 113 carried by the robot 130 (FIG. 5, Block 515). In this aspect, where the tote 113 is carried by the robot 130 the payload support 132 of the robot 130 forms the collection tote location 112A. This can be referred to as "coupled" operation of the robot 130 and picker 170. On another aspect, the picker 170 is not instructed to go anywhere by the management system. Instead, the robots 130 are instructed to go to a location where a pick is needed. The picker 170 then looks for waiting robots 130 and walks to a waiting robot 130. A display on the robot 130 is configured to instruct the picker 170 what to pick from the storage location and put the picked item(s) into the tote 113 carried by the robot 130. In one aspect, where the next picker in the associated human pick zone, which may be same picker 170A and/or a different picker, is to transfer another stored item to the tote 113 a subsequent pick location is communicated to the next picker by one or more of the robot 130 and the management system 101. Where the pick instructions are communicated to the picker 170A by the robot 130 the user interface UI of the robot 130 indicates, for example, one or more of a pick location, a stored item to be picked and quantity to be picked. The picker 170A transfers a stored item from the subsequent pick location to the tote and so on (e.g. blocks 515 and 520 in FIG. 5 are repeated until there are no further stored items in the pick order 107 assigned to a picker in an associated pick zone to pick). Where there are no more assigned stored items for the next picker in the associated pick zone, such as picker 170A, to pick the robot 130 travels to another picker 170B at another collection tote location 112B (FIG. 5, Block 525) where blocks 515 and 520 in FIG. 5 are repeated to transfer at least stored item 220B to the tote 113 until there are no further stored items in the pick order 107 assigned to picker 170B to pick. In the example illustrated in FIG. 4, there are three collection tote locations 112A-112C at which a respective picker 170A-170C transfers a respective stored item 220A-220C to a common tote 113 that is carried by a single robot 130 (e.g. the robot is common robot to the pick locations) however, in other aspects any suitable number of stored items may be transferred to the tote at any suitable number of collection tote locations. In other aspects, the single robot 130 transport the common tote 113 to each collection tote location 112A-112n corresponding to a store and/or customer pick order. In still other aspects, more than one robot 130 transports the common tote 113 to each collection tote location 112A-112n corresponding to the store and/or customer pick order.

When the pick order 107 is complete (e.g. there are no more stored items to pick and the order is completed) the robot 130 delivers the tote 113 to a tote holding location 120C such as a pack and ship area or order fulfillment collection zone for fulfillment of the order (FIG. 5, Block 530). As may be realized in the aspects of the disclosed embodiment described herein, upon arrival at the tote holding location 120C such as the pack and ship area or order fulfillment collection zone, the robot 130 presents the tote 113 to a person (while the tote remains on the robot) at the tote holding location 120C, drops the tote off at the tote holding location 120C, and/or interacts with other automated machinery at the tote holding location 120C for fulfilling the customer order. As may also be realized, upon completion of the picker tasks the management system 101 provides instructions to the pickers 170A-170C for reassignment (e.g. for transferring items for another order to another tote carried by another robot) (FIG. 5, Block 540). Similarly, the robot 130 receives instructions from the management system 101 to recharge a power supply of the robot (FIG. 5, Block 535) or to retrieve another tote for fulfillment of another order.

Figure 6:
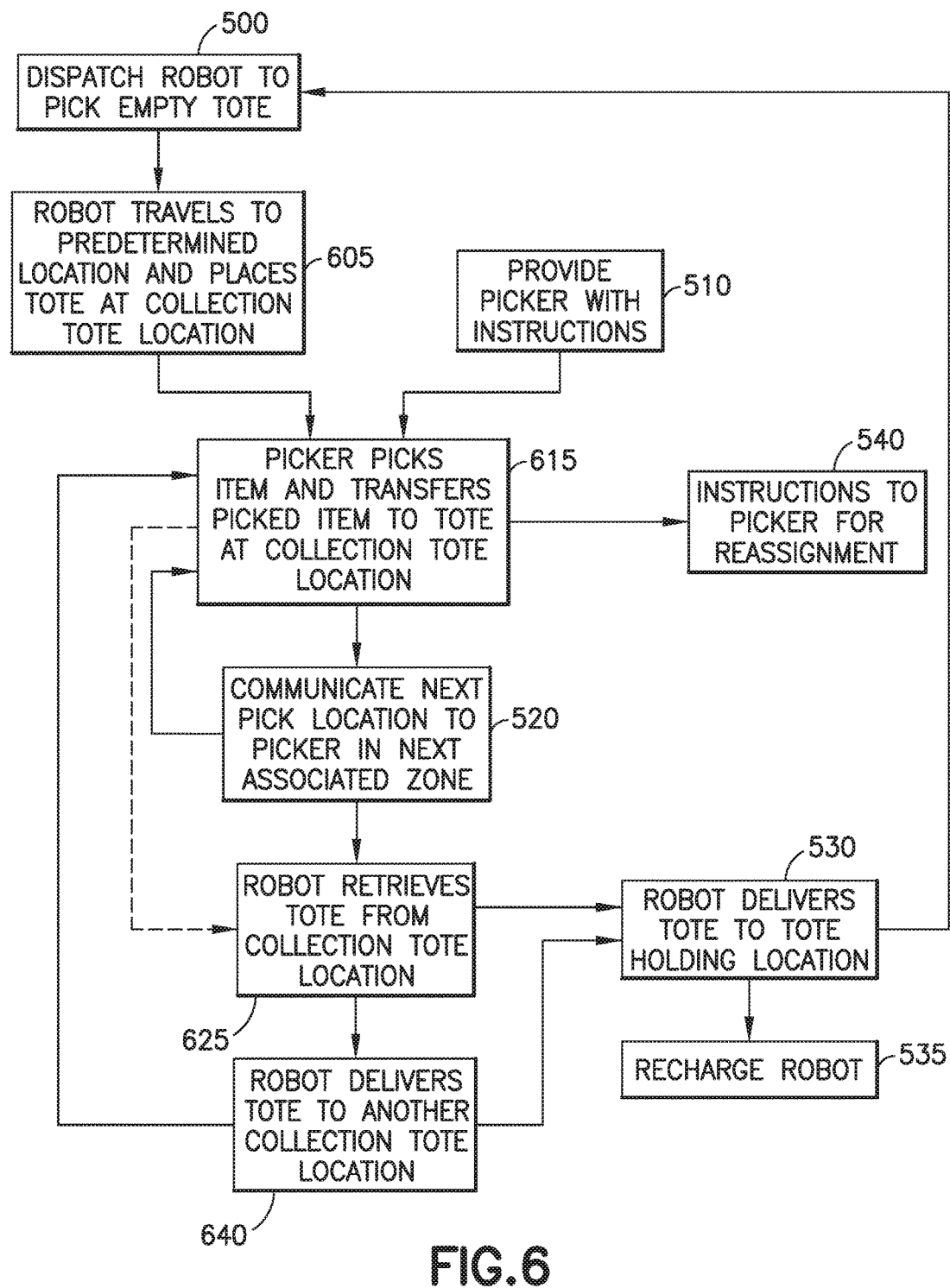
Figure 7:
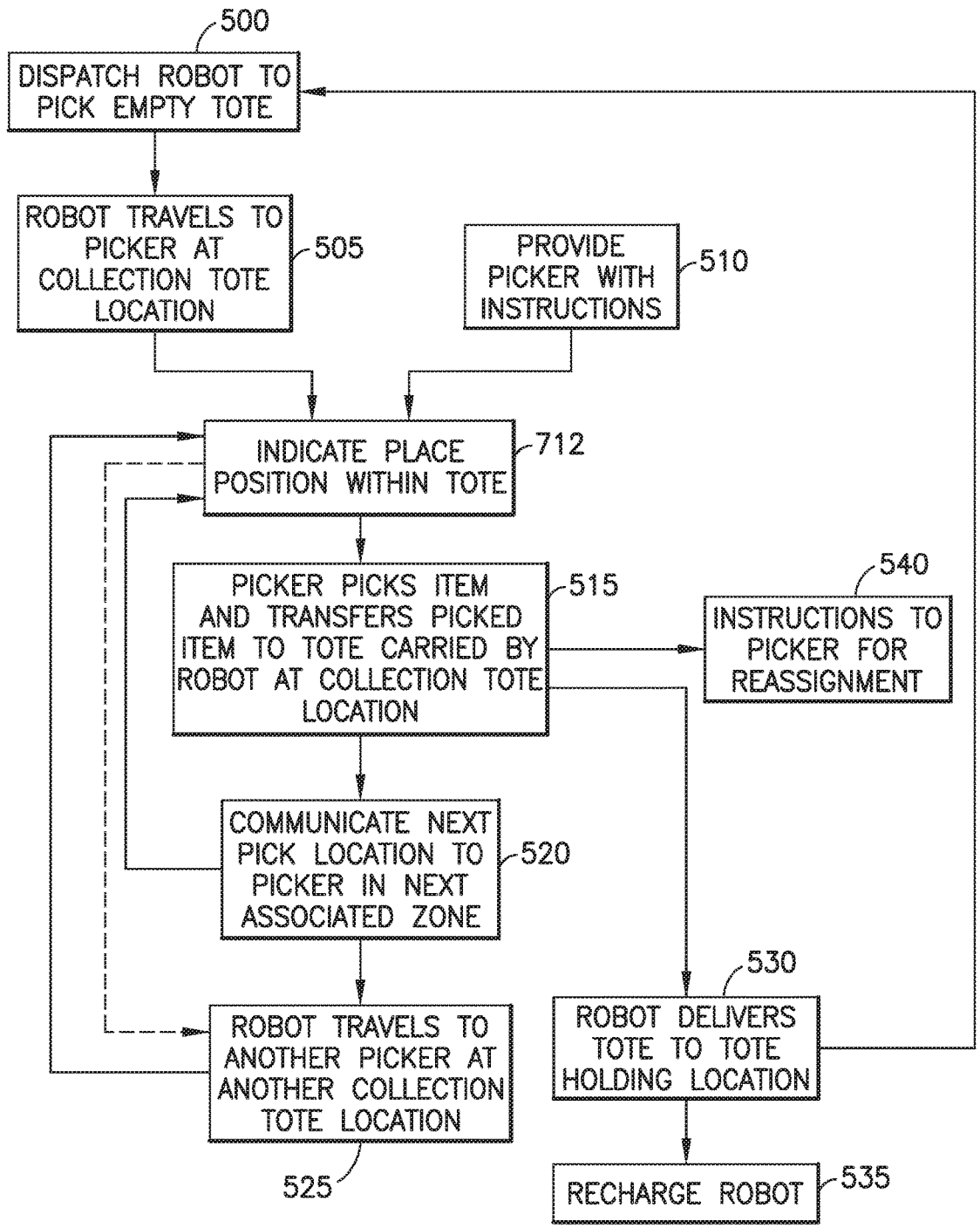
Figure 8:
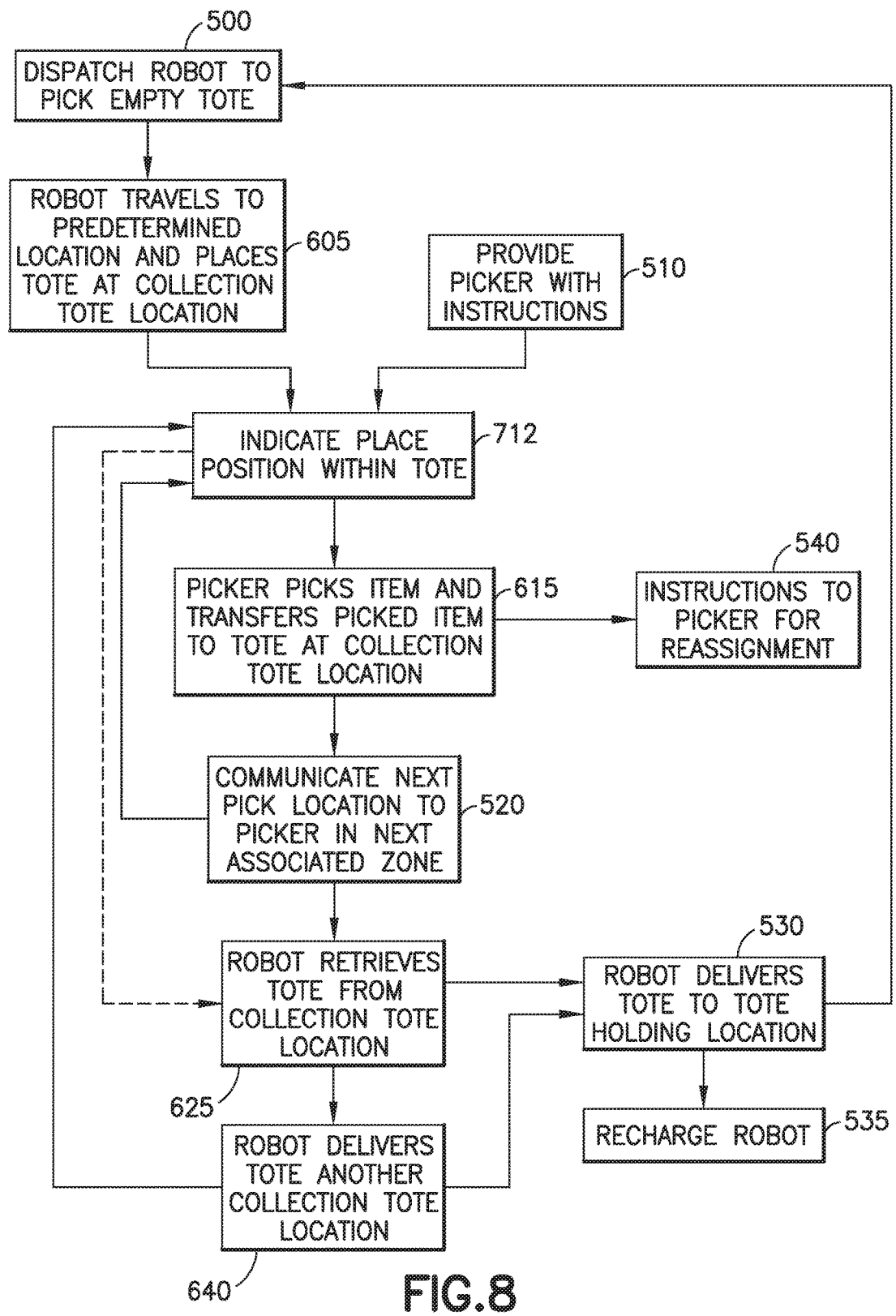

Still referring to FIGS. 1 and 4 in one aspect the robot 130 places the tote in a collection tote location 112A-112D that is not located on the robot 130 for transfer of stored items from the storage spaces SS to the tote 113. In this aspect, the collection tote location is one of an aisle collection location 112A-112C, a rack collection location 112D or a combination thereof or any other suitable off-robot tote holding location. For example, the management system 101 provides instructions to a robot 130 so the robot 130 is dispatched to pick an empty tote 113 from any suitable tote holding location 120B based on, for example, a robot traverse status (e.g. a status of robot movement including robot impediments and/or robot advancements along the path P) (FIG. 6, Block 500). The robot 130, carrying the tote 113 travels/traverses to a predetermined location, such as collection tote location 112A and places the tote at the collection tote location 112A (FIG. 6, Block 605). The management system 101 provides a picker 170A with picking instructions that indicate a location (e.g. collection tote location 112A) to which the picker is to transfer a stored item to the tote 113 (FIG. 5, Block 510). With the picker 170A and tote 113 both at the collection tote location 112A, the picker 170A picks the stored item 220A and transfers the stored item 220A to the tote 113 (FIG. 5, Block 615). In one aspect, where the next picker in the associated human pick zone, which may be the same picker 170A and/or a different picker, is to transfer another stored item to the tote 113 a subsequent pick location is communicated to the next picker by the management system 101. The picker transfers a stored item from the subsequent pick location to the tote and so on (e.g. blocks 615 and 520 in FIG. 6 are repeated until there are no further stored items in the pick order 107 assigned to a picker in an associated pick zone to pick). Where there are no more assigned stored items for the next picker in the associated pic zone, such as picker 170A, to pick the robot 130 retrieves the tote 113 from the collection tote location 112A (FIG. 6, Block 625) and delivers the tote 113 to another collection tote location 112B (FIG. 5, Block 640) where blocks 615 and 520 in FIG. 6 are repeated to transfer at least stored item 220B to the tote until there are no further stored items in the pick order 107 assigned to picker 170B to pick. As noted above, in the example illustrated in FIG. 4, there are three tote collection locations 112A-112C at which a respective picker 170A-170C transfers a respective stored item 220A-220C to a common tote 113 however, in other aspects any suitable number of stored items may be transferred to the tote at any suitable number of collection tote locations. When the pick order 107 is complete (e.g. there are no more stored items to pick and the order is completed) the robot 130 delivers the tote 113 to a tote holding location 120C such as a pack and ship area or order fulfillment collection zone for fulfillment of the order (FIG. 6, Block 530). As may be realized, upon completion of the picker tasks the management system 101 provides instructions to the pickers 170A-170C for reassignment (e.g. for transferring items for another order to another tote carried by another robot) (FIG. 6, Block 540). Similarly, the robot 130 receives instructions from the management system 101 to recharge a power supply of the robot (FIG. 6, Block 535) or to retrieve another tote for fulfillment of another order.

In one aspect multiple orders are collected in a common tote 113. For example, referring to FIGS. 3A-3C the tote is a configurable tote in which one or more containers 360, 361 and/or dividers 362, 363 are placed for forming cells 350.

The management system 101 assigns each cell 350 to a predetermined stored item of a respective pick order 107 so that when the tote is delivered to the tote holding locations, such as the pack and ship location or order fulfillment collection zone, the different orders are fulfilled with stored items (which are now picked items) from cells assigned to the respective orders. For example, where the single robot 130 carries a common tote 113 the order fulfillment is substantially the same as described above with respect to FIGS. 1, 4 and 5 however, when items are placed in the tote 113 one or more of the management system 101 and the robot 113 indicates which cell the picked item is to be placed. For example, where the position of the picked item within the tote 113 is communicated to a picker 170 by the management system 101 the communication is one or more of any suitable aural and visual communication (such as over a headset or a graphical user interface worn by the picker. Where the position of the picked item within the tote 113 is communicated to a picker 170 by the robot, the communication is also one or more of any suitable aural and visual communication presented to the picker by, for example, the user interface UI of the robot or a pick to light system (which is, in one aspect, part of the user interface) disposed on the robot 130.

Figure 9:
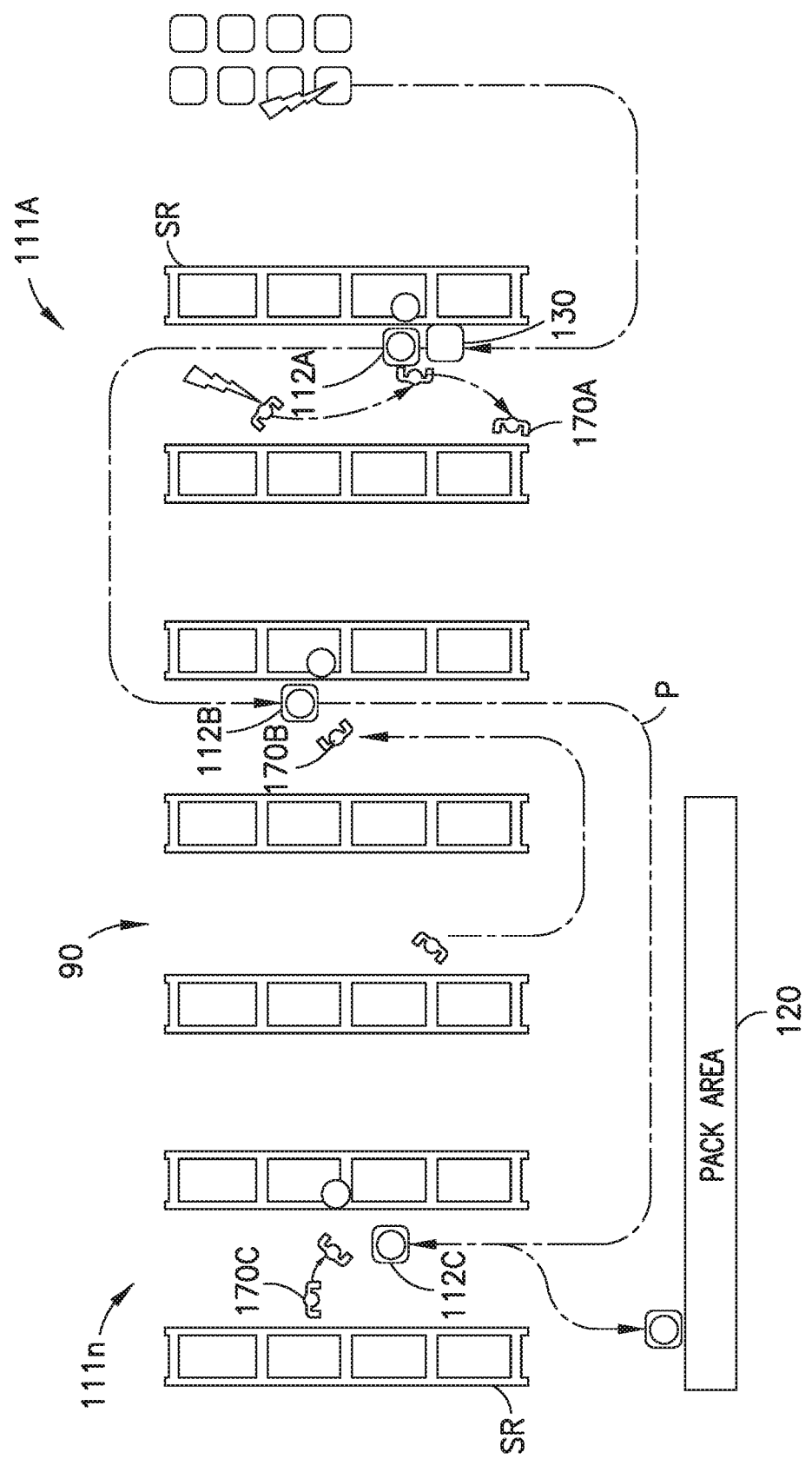
FIGS. 9-11 are schematic illustrations of portions of the material handling system of FIG. 1 in accordance with aspects of the disclosed embodiment.

Referring now to FIGS. 1 and 9-11 variations of the above-described order fulfillment operations will be described. For example, FIG. 9 illustrates an order fulfillment where items are transferred to a tote 113 where the tote is located in both a collection tote location off of the robot 130 and a collection tote location on the robot 130. For example, the picker 170A is provided with instructions for picking one or more stored items in a manner substantially similar to that described above (FIG. 12, Block 510). The picker 170A transfers the one or more stored items (now referred to as picked items) into the tote 113 located at the collection tote location 112A in a manner substantially similar to that described above (with or without an indication of which cell(s) 350 of the tote 113 to place the picked item(s) in) (FIG. 12, Block 615). A robot 130 is dispatched in a manner substantially similar to that described above to pick the tote 113 from the collection tote location 112A (FIG. 12, Block 1220) and travels to another picker 170B at another collection tote location 112B (FIG. 12, Block 525). The next picker in an associated pick zone, such as picker 170B, picks one or more stored items and transfers the one or more stored items (which is/are now one or more picked items) into the common tote 113 carried by the robot 130 in a manner substantially similar to that described above (FIG. 12, Blocks 515, 520). The robot 130 continues to travel to other pickers 170C at other collection tote locations 112C until all items in the pick order 107 are picked and the order is completed. The robot 130 transfers the tote 113 to a tote holding location 120 such as a pack and ship location or order fulfillment collection zone (FIG. 12, Block 530). The picker(s) 170A-170C are reassigned and the robot 130 is either charged or dispatched to fulfill another order as described above (FIG. 12, Blocks 535, 540).

Figure 10:
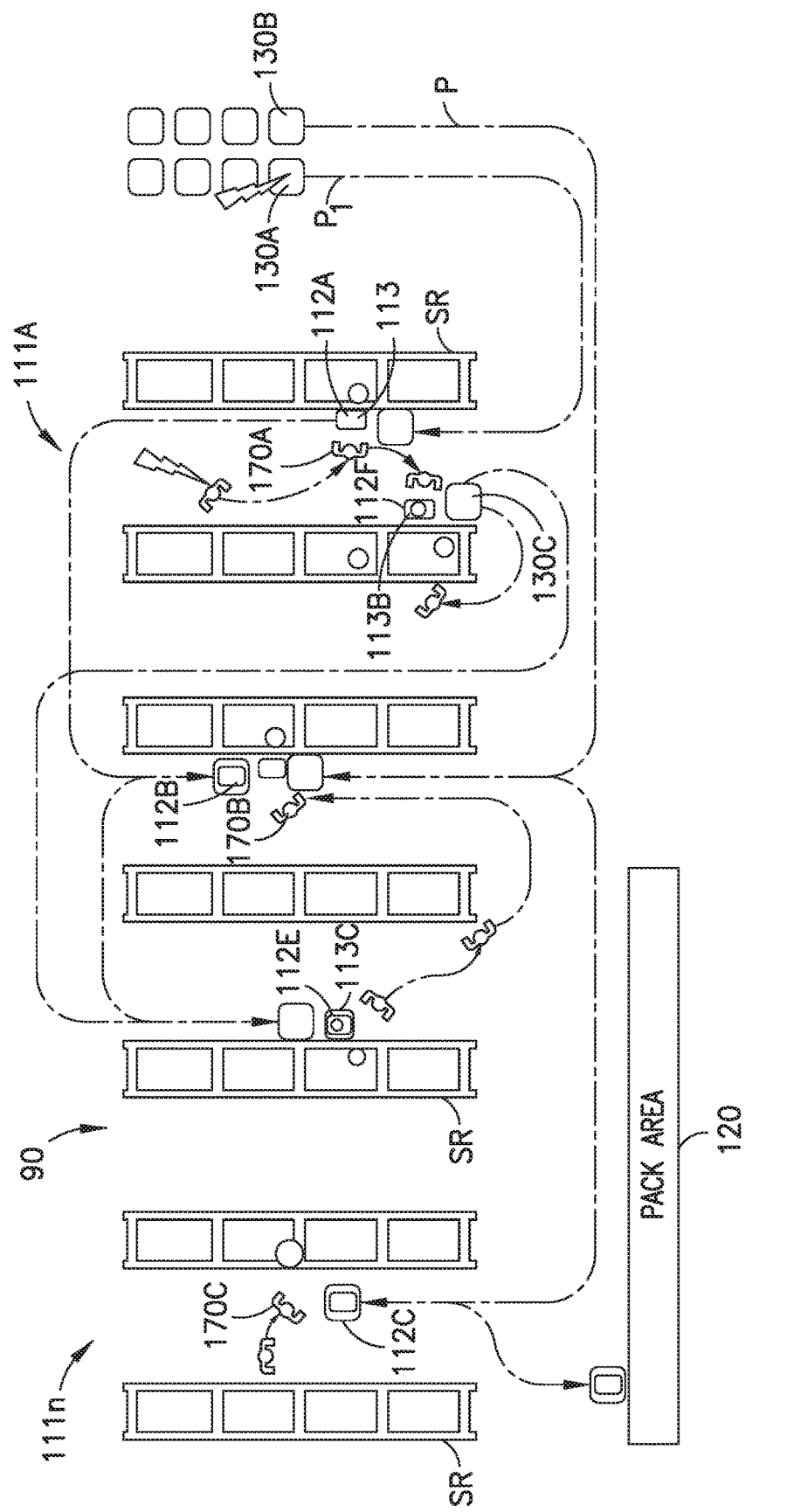
Figure 13:
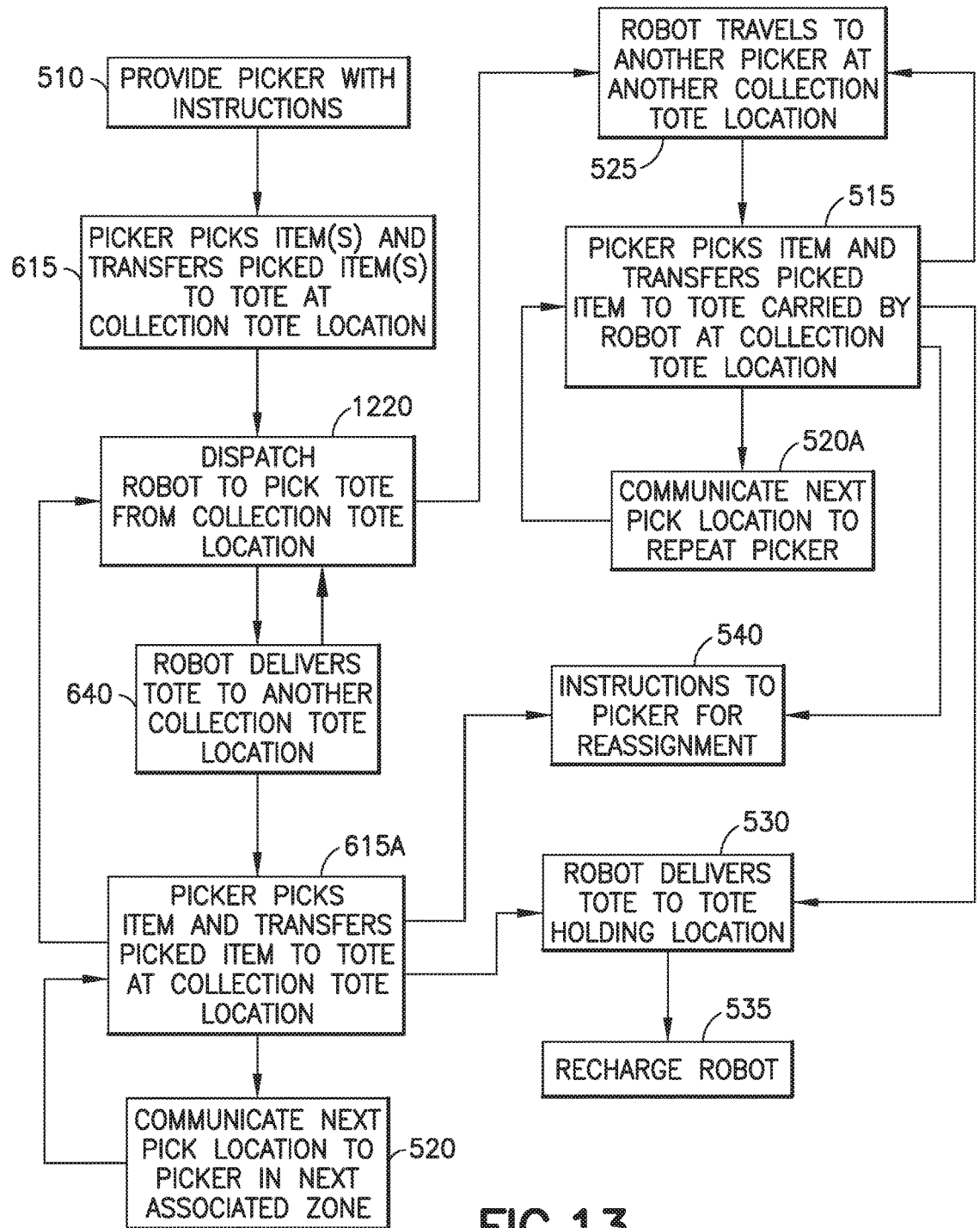

FIG. 10 illustrates an order fulfillment where several robots 130A-130C are actively picking, placing and transporting totes 113. Here picker 170A is provided with instructions for picking a stored item for placement in a tote as described above (FIG. 13, Block 510). The picker 170A places the stored item in the tote 113 located at collection tote location 112A. A robot 130A is dispatched to pick the tote 113 from the collection tote location 112A (FIG. 13, Block 1220) and transfers/delivers the tote 113 to another collection tote location 112B (FIG. 13, Block 640). Robot 130A is then able to pick another collection tote 113C from another collection tote location 112E (FIG. 13, Block 1220). A next picker in an associated pick zone, such as picker 170B, picks one or more stored items and transfers the one or more now picked items to the tote 113 at collection tote location 112B (FIG. 13, Blocks 615A and 520) in the manner described above. Another robot 130B is dispatched to pick the collection tote 113 from the collection tote location 112B (FIG. 13, Block 1220). The robot 130B travels to yet another collection tote location 112C, with the tote 113 (FIG. 13, Block 525) so that another, e.g. next picker in an associated pick zone, such as picker 170C picks one or more stored items and transfers the one or more now picked items to the tote 113 at collection tote location 112C (FIG. 13, Blocks 515 and 520) in the manner described above. The robot 130B transfers the tote holding the completed order(s) to the tote holding location 120 such as a pack and ship location or order fulfillment collection zone (FIG. 13, Block 530). As may be realized, multiple orders may be picked simultaneously as described above where the tote includes cells 350 into which items for different orders are placed. The picker(s) are reassigned and the robot is either charged or dispatched to fulfill another order as described above (FIG. 13, Blocks 535, 540). As can be seen in FIG. 10, another robot 130C may pick, place and transport tote 113B in a manner substantially similar to that described above such that the tote 113B is passed between robots or delivered substantially directly to the tote holding location 120 by the robot 130C.

Figure 11:
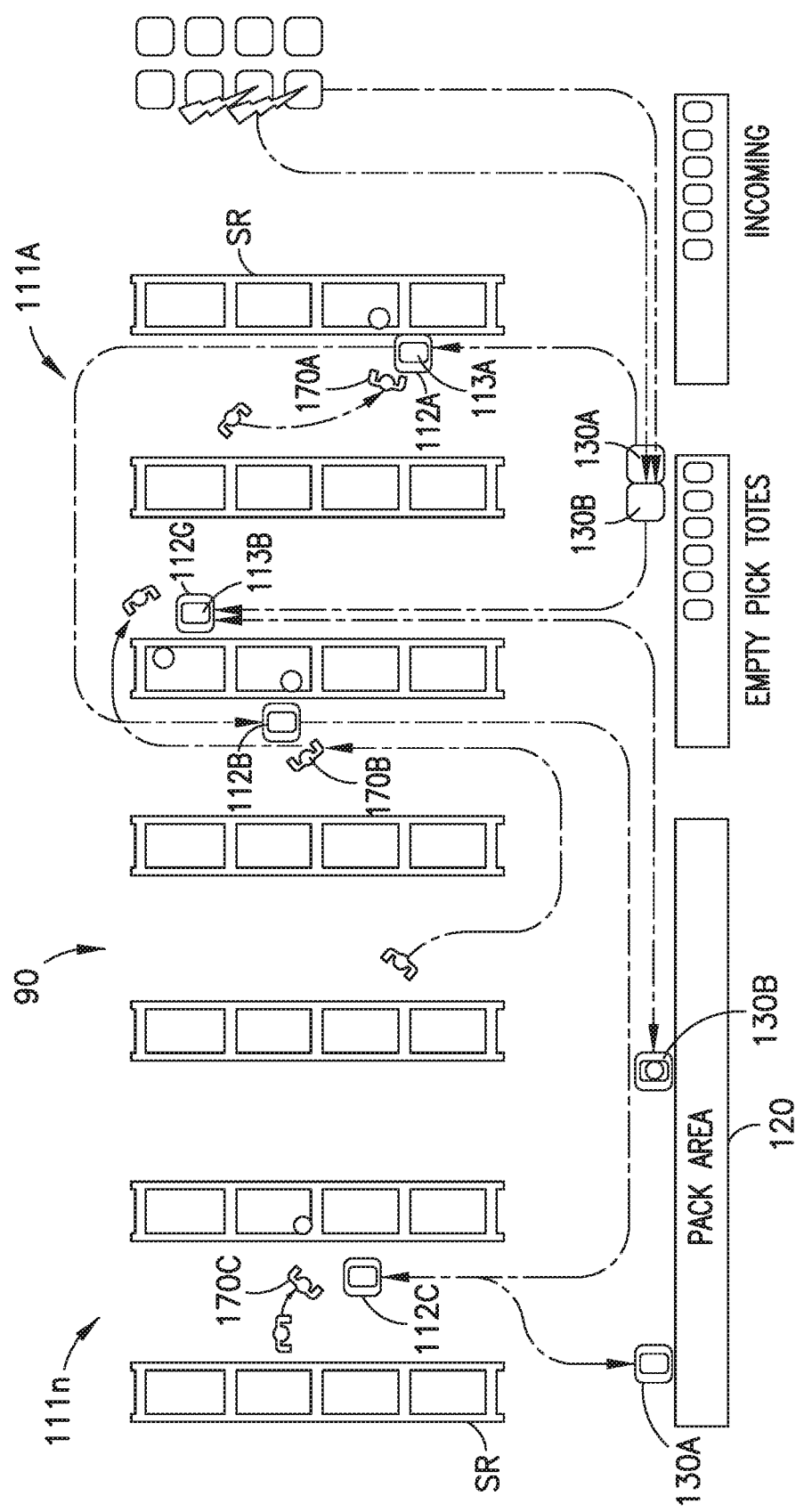
Figure 12:
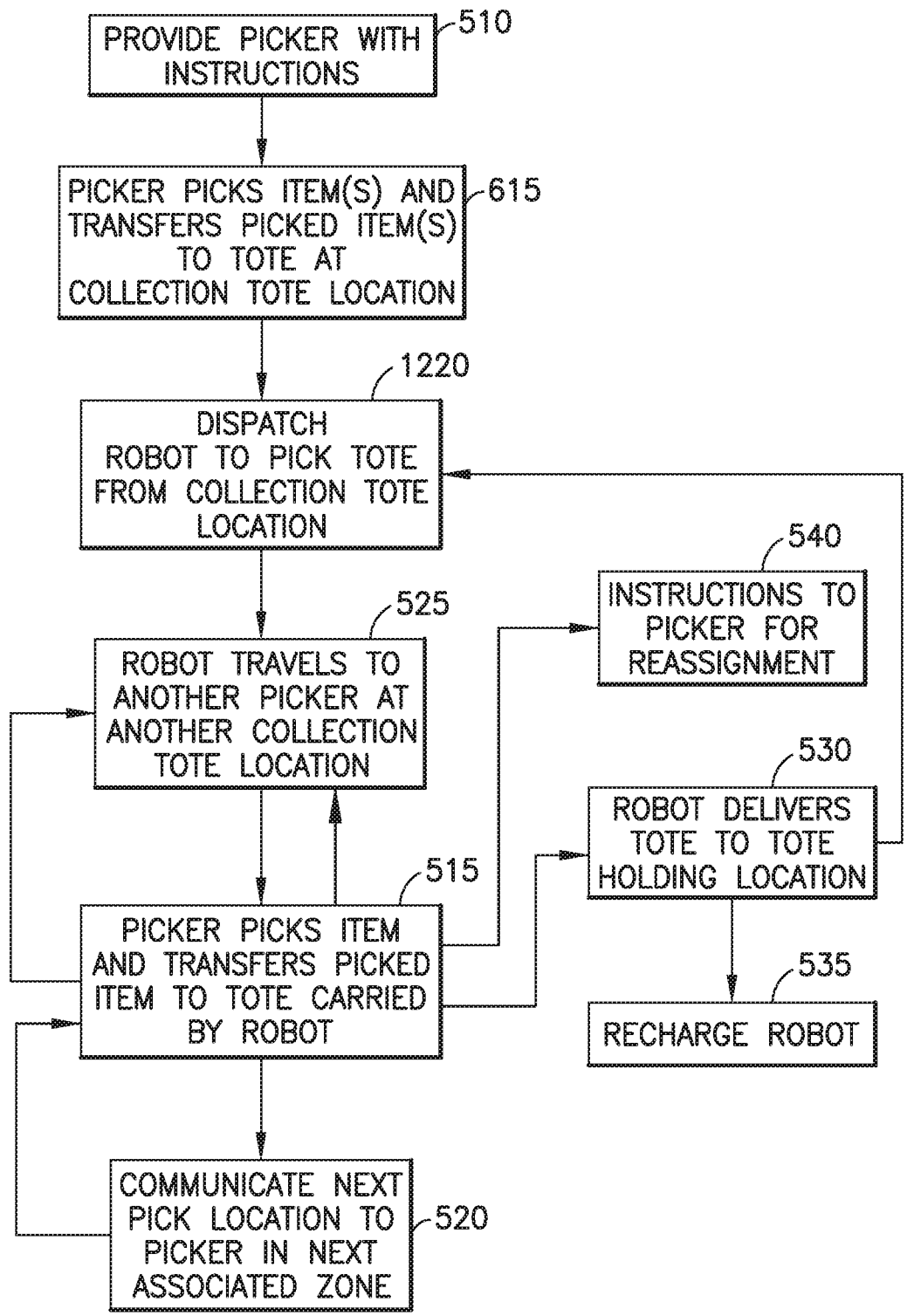
FIGS. 12 and 13 are order fulfillment flow diagrams in accordance with aspects of the disclosed embodiment.

FIG. 11 illustrates an order fulfillment with two separate orders being picked by two different robots 130A, 130B. Here each robot 130A, 130B picks an empty tote 113A, 113B (FIG. 5, Block 500) and travels to one or more respective collection tote locations (robot 130A travels to collection tote locations 112A, 112B, 112C and robot 130B travels to collection tote location 112G) where at least one common picker 170A-170C places stored items in the totes 113A, 113B carried by the robots 130A, 130B in a manner substantially similar to that described above with respect to blocks 505-525 of FIG. 5. In other aspects the pickers are not common to the robots 130A, 130B. The robots 130A, 130B transport the totes with the completed orders therein to the tote holding location 120 in a manner substantially similar to that described above with respect block 530 of FIG. 5.

Figure 23:
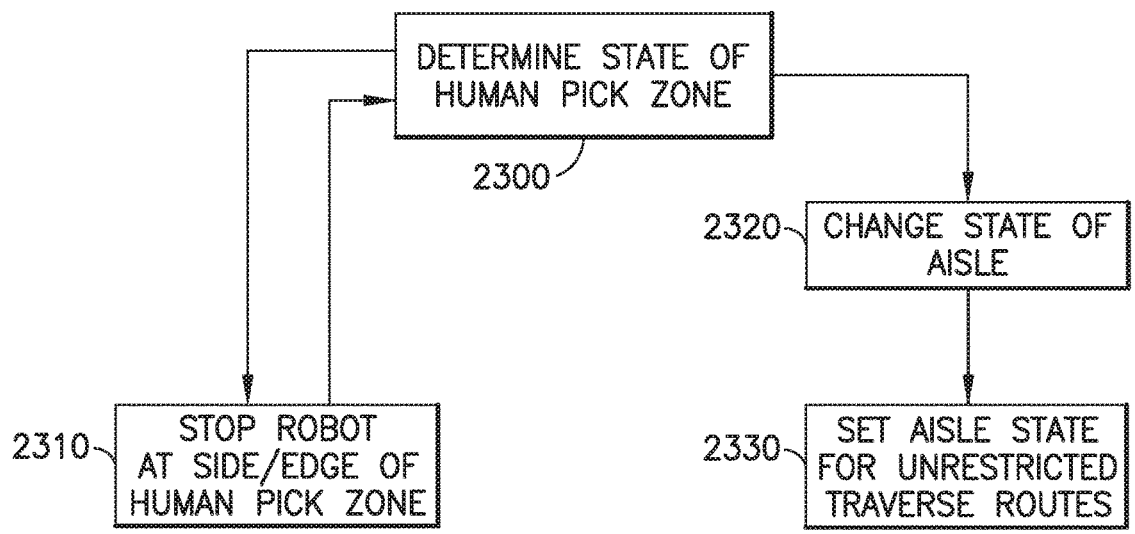
FIG. 23 is a flow diagram of a human pick zone/aisle state determination in accordance with aspects of the disclosed embodiment.

As can be seen above, in one aspect, the human pick zones 111A-111n are not fixed and are managed by, for example, the management system 101 so that pickers 170 travel between human picking zones 111A-111n to optimize efficiency and to have pickers 170 available where product is stored. In other aspects, the human pick zones 111A-111n are fixed so that each human pick zone 111A-111n has a predetermined number of pickers 170 therein. As can also be seen above, the storage racks SR are arranged so as to form aisles 90 therebetween where the human pickers 170 and the robots traveling along respective paths P, P1 are comingled in the aisles 90. As may be realized, at least a portion of the aisles 90, in one aspect, includes an exclusion zone or area EZ within which the robot 130 travels and/or which includes picker 170 access to the collection tote location. In one aspect, the exclusion zone EZ is dynamically located depending on, for example, a path or traverse route of the robot 130 and a location of the collection tote location within the aisle 90. In one aspect, the exclusion zone EZ may correspond to a human pick zone 111A-111n where the robot 130 is restricted from entering the human pick zone 111A-111n. In one aspect the management system 101 is configured to select a traverse route for the robot(s) 130 based on a status of the picker 170 at one or more pick zones related to, for example, a store a/or customer pick order. In one aspect, the management system 101 is configured to select aisles 90 without human pickers 170 located therein for the robot traverse route(s). For example, referring to FIG. 21 a bot 130 may deliver, for example, a tote from a tote holding location 120 to a collection tote location 112. The management system 101 selects the traverse route or path P21 of the robot 130 by determining the status of the human pick zones 111A, 111B in aisles 90A, 90B (FIG. 23, Block 2300). The management system 101 knows the locations of the pickers 170, in the manner described above, such as from any suitable signaling device worn by the picker 170 or that detects the picker 170 and determines that the human pick zone 111A in aisle 90A does not have a picker 170 located therein while the human pick zone 111B in aisle 90B has a picker 170 located therein. The management system 101 changes a state of the aisle 90A (FIG. 23, Block 2320) from a human pick zone state to a traverse route state and sets the aisle state for unrestricted traverse routes (FIG. 23, Block 2330) allowing the robot(s) 130 to travel through aisle 90A. In another aspect, where, for example, the management system 101 determines (FIG. 23, Block 2300) that the human pick zones 111A, 111B both have a picker 170 located therein, the management system 101 may stop the robot 130 at an edge or side 111EG of one of the human pick zones 111A, 111B (FIG. 23, Block 2310) and periodically determine the state of the human pick zones 111A, 111B (FIG. 23, Block 2300). Once the management system 101 determines that at least one of the human pick zones 111A, 111B (such as human pick zone 111A) does not have a picker 170 located therein the management system 101 changes a state of, for example, aisle 90A (FIG. 23, Block 2320) from a human pick zone state to a traverse route state and sets the aisle state for unrestricted traverse routes (FIG. 23, Block 2330) allowing the robot(s) 130 to travel through aisle 90A.

Figure 22A:
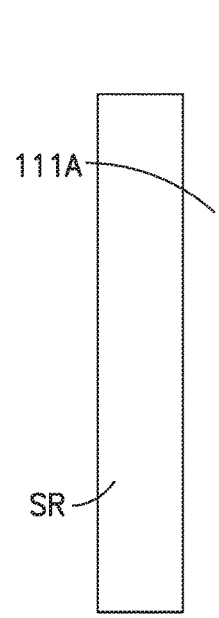
FIGS. 22A-22C are schematic illustrations of portions of the material handling system of FIG. 1 in accordance with aspects of the disclosed embodiment.
Figure 22B:
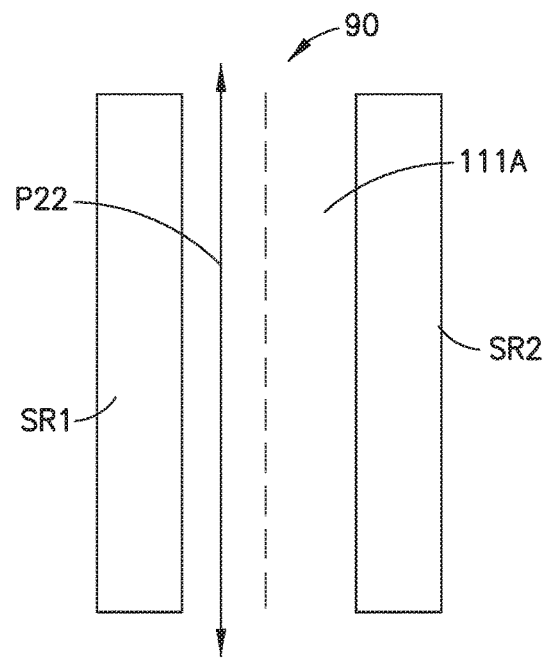
Figure 22C:
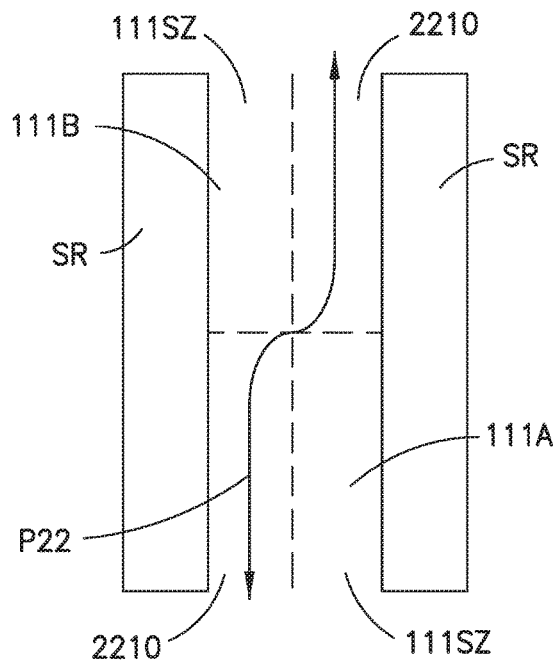
Figure 24:
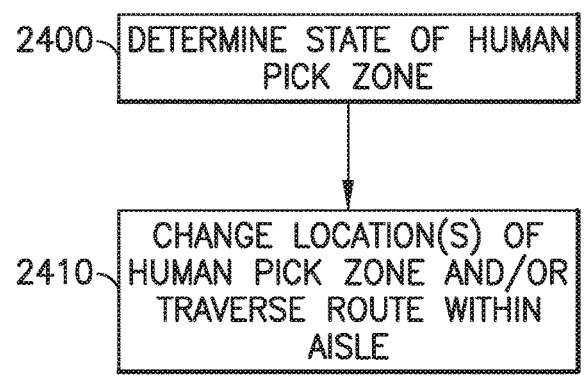
FIG. 24 is a flow diagram of dynamically changing human pick zones and/or traverse routes in accordance with aspects of the disclosed embodiment.

Referring to FIGS. 22A-22C, in one aspect, one or more human pick zones 111A-111n and the traverse routes may coexist in a common aisle 90. For example, FIG. 22 illustrates an aisle 90 having a storage rack SR along one side of the aisle 90. The human pick zone 111A is disposed in the aisle 90 adjacent the storage rack SR. The robot 130 traverse route P22 is located within the aisle opposite the human pick zone 111A (e.g. the human pick zone 111A is disposed between the traverse route P22 and the storage rack SR). FIG. 22B illustrates an aisle 90 having storage racks SR1, SR2 disposed on opposite sides of the aisle 90. Here, the human pick zone 170 is located on and forms one side of the aisle 90 and the traverse route P22 is located on and forms the other side of the aisle 90. In this example, the human pick zone 111A is located on and forms the side of the aisle 90 corresponding to the storage rack SR1, SR2 from which stored items are picked. In the example shown in FIG. 22B the human pick zone is located adjacent storage rack SR2 but in other aspects the position of the human pick zone is dynamically variable. For example, the management system 101, in a manner similar to that described above, is configured to determine a state of the human pick zone 111A within the aisle 90 (FIG. 24, Block 2400). Depending on which storage rack SR1, SR2 the stored items are to be picked (e.g. the active storage rack) the management system 101 changes the location of the human pick zone 170 and/or the traverse route P22 (FIG. 24, Block 2410) to define the human pick zone 111A to be located on a side of the aisle 90 that corresponds with the active storage rack and defines the traverse route P22 to be adjacent the inactive storage rack (e.g. the rack from which stored items are not being picked). In another aspect, the human pick zones 111A, 111B and the traverse route P22 contiguously coexist within a common aisle as illustrated in FIG. 22C. In this aspect, the aisle 90 has two sides however, each side is divided into one or more human picking zone sections 111SZ and one or more traverse route sections 2210 where the human picking zone sections 111SZ and one or more traverse route sections 2210 are contiguous on a common side of the aisle. In this aspect, the management system 101 may determine that each human picking zone 111A, 111B has a picker 170 located therein (FIG. 24. Block 2400) and change the location(s) of the traverse route P22 (FIG. 24, Block 2410) so that the traverse route P22 passes through traverse route sections 2210. In other aspects, still referring to FIG. 22C, the human pick zones 111A, 11B may be located on a common side of the aisle so that the traverse route P22 is established along only one side of the aisle. As mentioned herein, in other aspects, all human pickers 170 and human pick zones 111A-111n may be substituted with robotic pickers and robotic pick zones.

Figure 14:
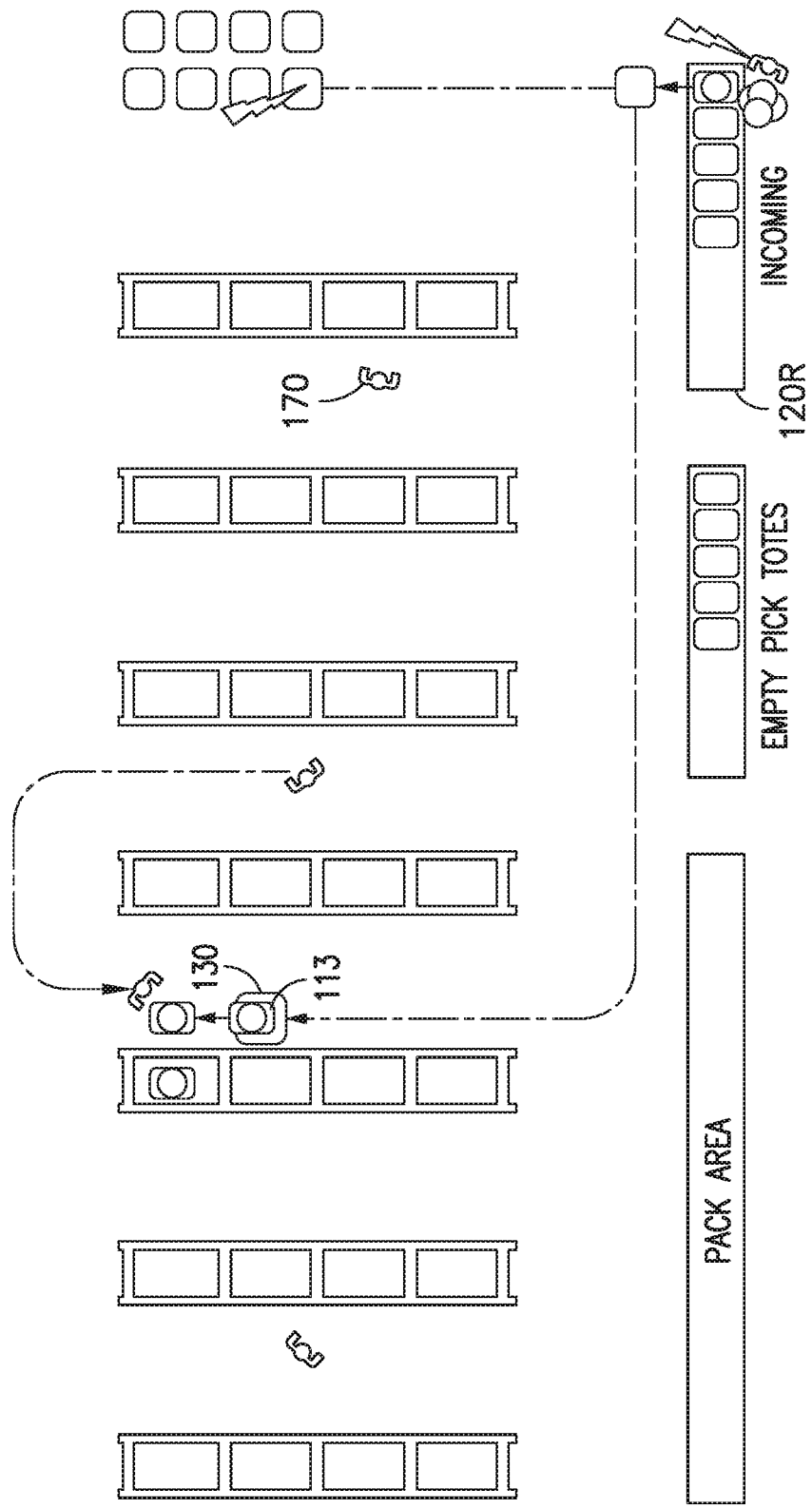
FIG. 14 is a schematic illustration of a portion of the material handling system of FIG. 1 in accordance with aspects of the disclosed embodiment.
Figure 15:
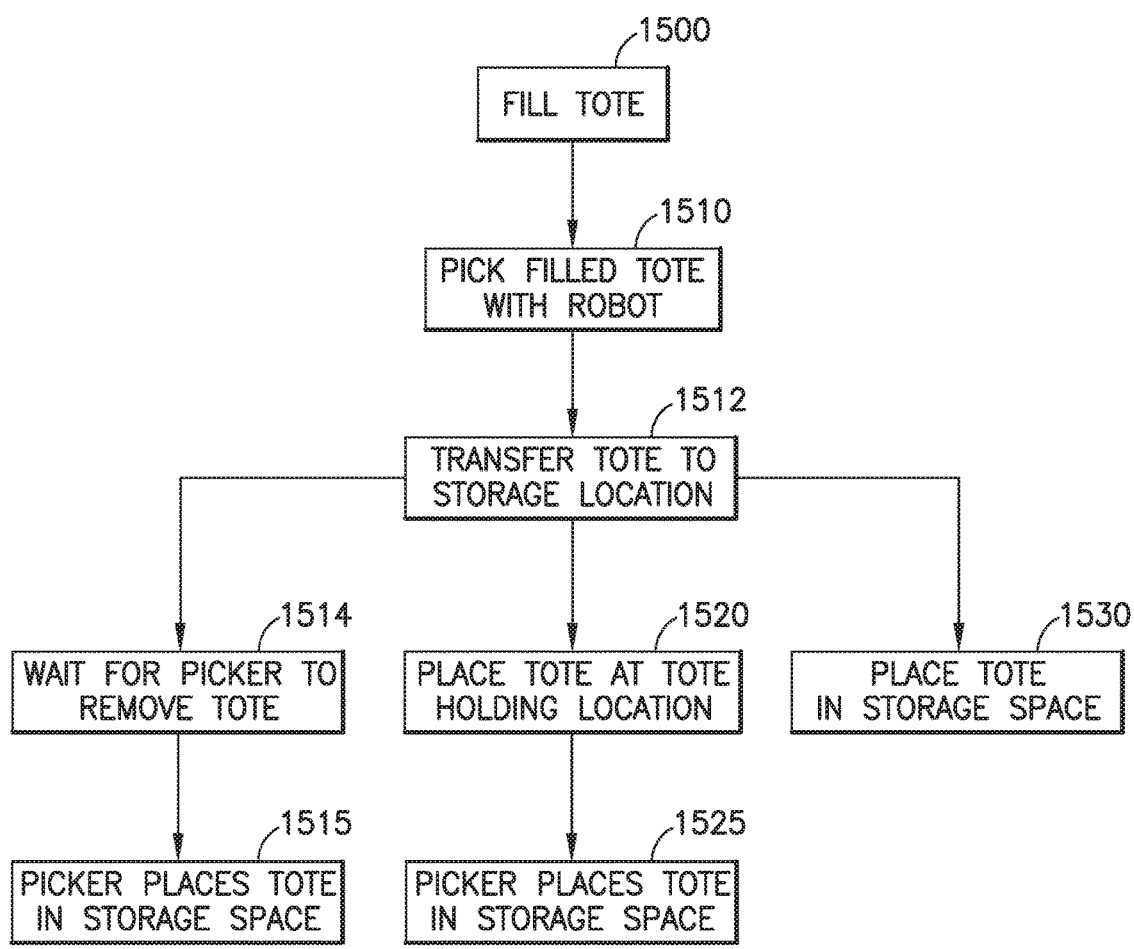
FIG. 15 is an order fulfillment flow diagram in accordance with aspects of the disclosed embodiment.

As may be realized, referring to FIG. 14, the material handling system 100, in one aspect, also functions to replenish inventory as well as order returns. In this aspect of disclosed embodiment a picker 170 is directed by the management system 101 to fill a tote 113 located at a tote holding location 120R such as a replenishment station (which in one aspect is similar to the packing station) with one or more items to be placed in storage (FIG. 15, Block 1500). In one aspect the tote 113 is filled with a plurality of the same item, or in other aspects different items, in order to re-stock the distribution center. The management system 101 directs the robot 130 to pick the filled tote from the tote holding location 120R (FIG. 15, Block 1510). The robot 130 navigates to a predetermined storage area of the distribution center DC (FIG. 15, Block 1512) and either waits for a picker 170 to pick the tote 113 from the robot 130 (FIG. 15, Block 1514) where the picker 170 places the tote 113 in a predetermined storage space SS (FIG. 15, Block 1515); places the tote 113 in a tote holding location 120, which in this aspect may be a tote collection location 112, (e.g. a drop off location in an aisle or in a storage rack SR) (FIG. 15, Block 1520) where a picker transfers the tote 113 to a predetermined storage space SS (FIG. 15, Block 1525); or the robot places the tote 113 in a predetermined storage space SS (FIG. 15, Block 1530). Where the picker removes the tote 113 from the robot 130 or from the tote holding location 120, the picker as directed by the management system 101 moves the tote 113 from the robot and/or tote holding location 120 (e.g. drop off location) to the predetermined storage space SS on the storage rack SR. As may be realized, in other aspects, the picker 170 picks one or more items from the tote for placement in storage, such as within a partially depleted tote 113 located in a storage space SS of a storage rack SR.

Figure 16:
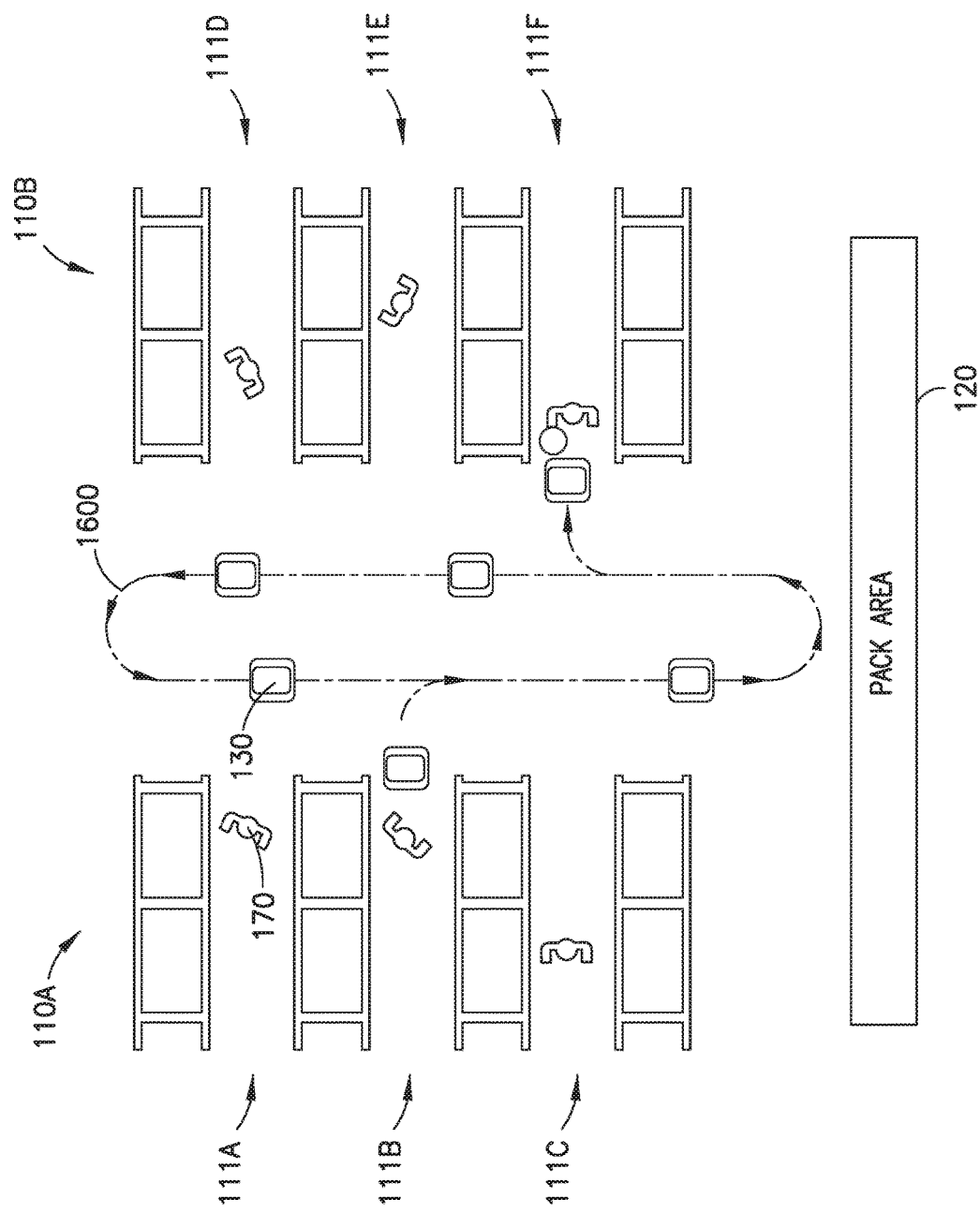
FIGS. 16 and 17 are schematic illustrations of portions of the material handling system of FIG. 1 in accordance with aspects of the disclosed embodiment.
Figure 17:
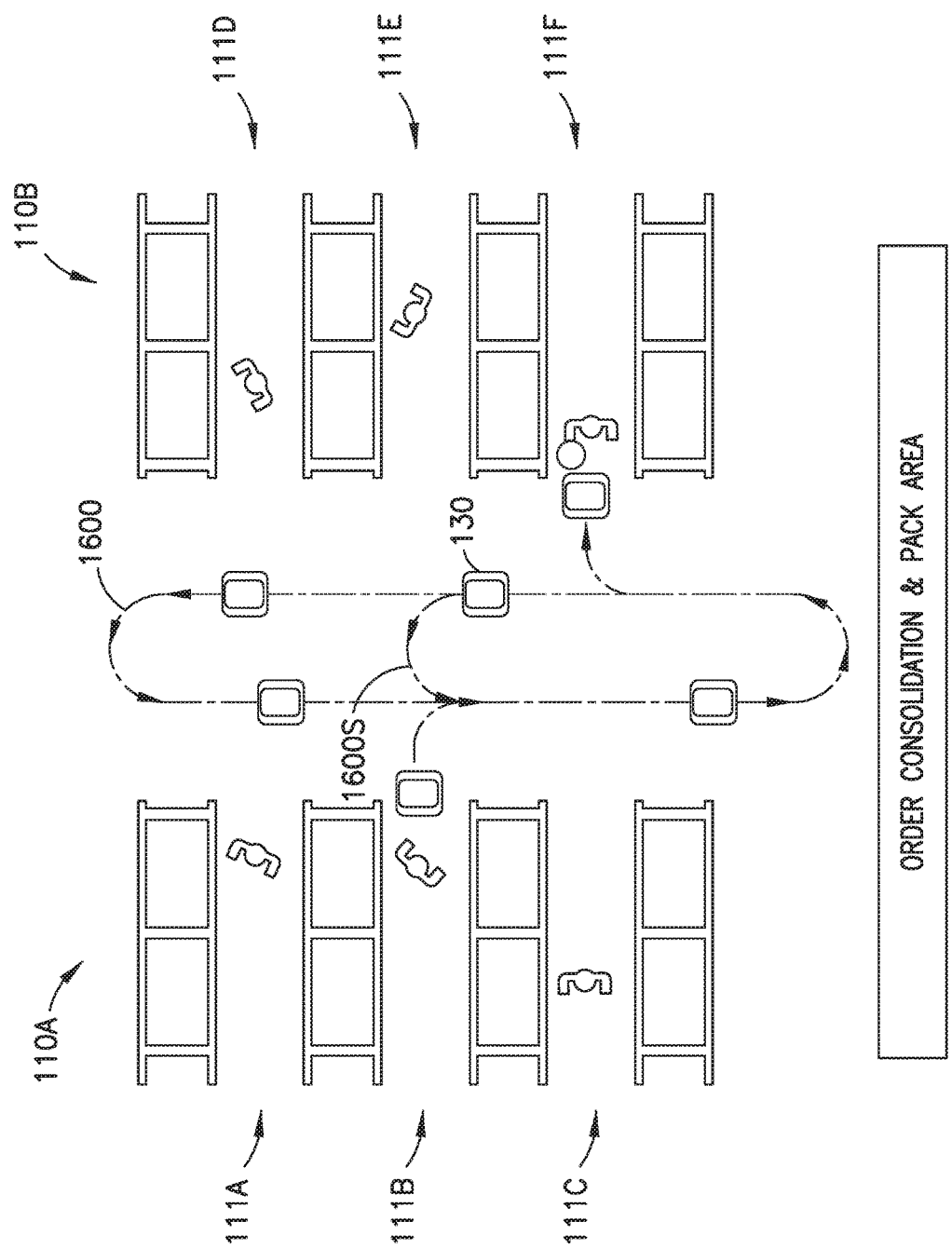

Referring to FIG. 16, the management system 101 is configured to direct the robots 130 to travel in a travel loop 1600 (e.g. a virtual conveyor) between adjacent fixed production and/or storage locations 110A, 110B where each fixed production and/or storage locations 110A, 110B includes respective human pick zones 111A-111F. In this aspect, the robots 130 travel around the travel loop 1600 to access each of the human pick zones 111A-111F. The robots 130 turn off of the travel loop to enter the human pick zones 111A-111F for picking or placing totes in a manner substantially similar to that described above. The robots 130 return to the travel loop 1600 for transporting totes 113 to a tote holding location such as packing and shipping area 120. Referring also to FIG. 17, as may be realized, a robot 130 carrying a tote 113 destined for the tote holding location 120 (e.g. packing and shipping location) can travel along a shunt 1600S to decrease robot travel time along the travel loop 1600. In one aspect the shunts 1600S are dynamically located and are located anywhere along the travel loop 1600 depending on robot traffic along the travel loop 1600. In other aspects the shunts 1600S are located at substantially fixed areas of the travel loop 1600.

In other aspects of the disclosed embodiment the material handling system 100 directs the robots 130 for the rearrangement of items in the distribution center DC as inventory levels change to make better use of the storage space. For example, the rearrangement of items is based on seasonality, promotions, etc. to position high demand items in locations that optimize the pick time/cost.

Figure 18:
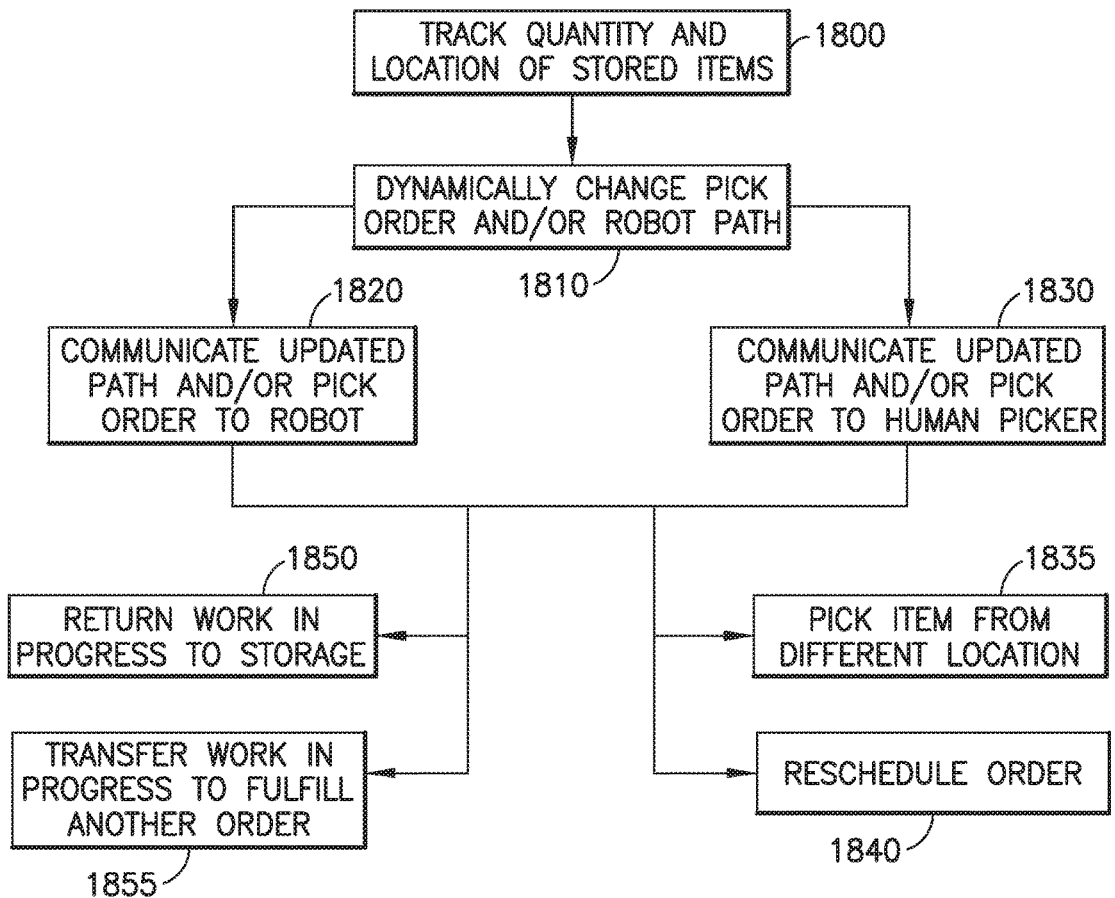
FIG. 18 is a flow diagram or a portion of an order fulfillment in accordance with aspects of the disclosed embodiment.

In one aspect, in the order fulfillment processes described herein, the material handling system 100 is robust to disruptions, such as for example insufficient material quantity and location inaccuracies, that result in the inability to fill an order. For example, referring to FIGS. 1, 4 and 18, in one aspect, the management system 101 is configured to track, in any suitable manner, a quantity of each item and a location of each item stored in the fixed production and/or storage locations 110A-110n (FIG. 18, Block 1800) so that as quantities of items are depleted the robot 130 paths P and/or pick order 107 for each order to be fulfilled is dynamically changed (FIG. 18, Block 1810). Each robot 130 communicates, through for example the communication module 135, in any suitable manner with the management system 101 and vice versa so that the robot 130 receives updates to a picking path P and a picking location (e.g. a location of the collection tote location, a location of a stored item and/or a location of a picker 170) (FIG. 18, Block 1820). Similarly each picker 170 communicates in any suitable manner with the management system 101 and vice versa so that the picker 170 receives updates to a picking location (e.g. a location of the collection tote location and/or a location of a stored item) (FIG. 18, Block 1830) so that the picker interfaces with a corresponding robot 130 and the depleted item is picked from a different location than the originally scheduled location (FIG. 118, Block 1835) or the order is scheduled for completion at a later time when the depleted item has been replenished or restocked within the distribution center DC (FIG. 18, Block 1840). Where there are insufficient items to fulfill an order (e.g. the items have been depleted during an order fulfillment by picking those items for another different order), order work in progress (e.g. items already picked and located within, for example, a tote) are, in one aspect, returned to a location in the storage racks SR (FIG. 2) from which they came within the distribution center DC (FIG. 18, Block 1850) while in other aspects the work in progress (e.g. the tote holding the already picked items) is transported to a tote holding location 120 such as a pack and ship location or order fulfillment collection zone for filling another order that is comprised in part or in full of the items within the tote (FIG. 18, Block 1855).

In accordance with one or more aspects of the disclosed embodiment a storage fill and retrieval system for a storage space includes a multiplicity of fixed storage locations distributed in the storage space in a predetermined ordered configuration and defining at least one human pick zone arranged for human picker access to pick, or place, items from the fixed storage locations arrayed in the at least one human pick zone, each of the at least one human pick zone having at least one collection tote location; at least one autonomous mobile robot configured for holding and transporting a tote within the storage space and having an end effector arranged for autonomous transfer of the tote between the at least one autonomous mobile robot and a tote holding station and between the at least one autonomous mobile robot and a collection tote location; a storage management system communicably connected to the at least one autonomous mobile robot and configured to associate each autonomous mobile robot of the at least one autonomous mobile robot with a human pick zone from the at least one human pick zones, each of the related human pick zones having at least one stored item in the fixed storage locations, of the related human pick zone, corresponding to a store and/or customer pick order of the storage management system; wherein the at least one autonomous mobile robot is configured to transport the tote to the collection tote location of each associated human pick zone, and wherein each collection tote location is arranged for human picker access and defines an interface between a human picker in the human pick zone and the at least one autonomous mobile robot.

In accordance with one or more aspects of the disclosed embodiment the storage management system includes a controller in communication with the human picker and the at least one autonomous mobile robot, and being configured so that the storage management system generates the interface between the human picker in the human pick zone and the at least one autonomous mobile robot and selectively determine if a state of the interface is a coupled interface or a decoupled interface.

In accordance with one or more aspects of the disclosed embodiment when the state of the interface is the coupled interface the human picker meets the at least one autonomous mobile robot effecting a tote fill at the collection tote location.

In accordance with one or more aspects of the disclosed embodiment when the state of the interface is the decoupled interface, a tote fill at the collection tote location is effected without the human picker and the at least one autonomous mobile robot meeting.

In accordance with one or more aspects of the disclosed embodiment the related human pick zones form a path in the store space connecting the collection tote locations that correspond to the store and/or customer pick order.

In accordance with one or more aspects of the disclosed embodiment the robot is configured to transport the tote to each collection tote location along the path.

In accordance with one or more aspects of the disclosed embodiment the robot transports a common tote to each collection tote location corresponding to the store and/or customer pick order.

In accordance with one or more aspects of the disclosed embodiment a common robot transports the common tote to each collection tote location corresponding to the store and/or customer pick order.

In accordance with one or more aspects of the disclosed embodiment more than one robot transports the common tote to each collection tote location corresponding to the store and/or customer pick order.

In accordance with one or more aspects of the disclosed embodiment the storage management system associates the common tote with at least one corresponding order and a corresponding robot so that the common tote is transported to each collection tote location by a common robot.

In accordance with one or more aspects of the disclosed embodiment the common tote is partitioned into more than one cell, the common tote being associated with more than one corresponding order and wherein the storage management system associates each cell with a different corresponding order from the more than one orders associated with the common tote.

In accordance with one or more aspects of the disclosed embodiment the storage management system directs the human picker at each of the related human pick zone respectively to fill the common tote at the collection tote location of the related human pick zone with an ordered stored item.

In accordance with one or more aspects of the disclosed embodiment the storage management system directs the human picker to the respective collection tote location based on a robot traverse status along the path.

In accordance with one or more aspects of the disclosed embodiment the storage management system determines different traverse routes for the at least one autonomous mobile robot to traverse the path, and wherein the storage management system selects a traverse route for the at least one autonomous mobile robot based on a status of the human picker at one or more of the related human pick zones.

In accordance with one or more aspects of the disclosed embodiment the fixed storage locations are distributed along aisles and the at least one human pick zone is disposed in the aisles, the storage management system being configured to select aisles without human pickers located therein for the traverse routes.

In accordance with one or more aspects of the disclosed embodiment the fixed storage locations are distributed along aisles and the at least one human pick zone is disposed in the aisles, and a controller of the storage management system is configured to determine states of the at least one human pick zone without human pickers located therein, and set an aisle state for unrestricted traverse routes of the at least one autonomous mobile robot.

In accordance with one or more aspects of the disclosed embodiment the fixed storage locations are distributed along aisles and the at least one human pick zone is disposed in the aisles, and the aisles have both human pick zones and bot traverse routes, the storage management system being configured to select a state of each aisle and change the state of the aisle from the at least one human pick zone to the bot traverse routes.

In accordance with one or more aspects of the disclosed embodiment the storage management system is configured to stop the at least one autonomous mobile robot at an edge or side of the at least one human pick zone located in the aisle, where the at least one autonomous mobile robot proceeds when the state of the aisle changes to a traverse route state.

In accordance with one or more aspects of the disclosed embodiment the storage management system is configured to stop the at least one autonomous mobile robot at a collection tote location where the tote is located at an edge of the related human pick zone, where the at least one autonomous mobile robot proceeds when the state of the aisle changes to a traverse route state.

In accordance with one or more aspects of the disclosed embodiment the fixed storage locations and the at least one human pick zone are disposed along aisles where the at least one human pick zone forms one side of a common aisle and the traverse route forms another side of the common aisle.

In accordance with one or more aspects of the disclosed embodiment the at least one human pick zone and the traverse route contiguously co-exist within the common aisle and the storage management system is configured to selectively switch locations of the at least one human pick zone and the traverse route within the common aisle In accordance with one or more aspects of the disclosed embodiment the storage management system determines different traverse routes for the at least one autonomous mobile robot to traverse the path, and wherein the management system selects a traverse route for the at least one autonomous mobile robot based on a status of the human picker at one or more of the related human pick zones.

In accordance with one or more aspects of the disclosed embodiment the storage management system associates the common tote with at least one corresponding store and/or customer pick order and the common tote is transported to each collection tote location corresponding to the store and/or customer pick order by more than one robot.

In accordance with one or more aspects of the disclosed embodiment the collection tote location of each human pick zone is positioned proximate to a side of the human pick zone providing access for the human picker to pick from the storage locations of the human pick zone.

In accordance with one or more aspects of the disclosed embodiment the system further includes a tote holding location that defines an order fulfillment collection zone, the at least one autonomous mobile robot being configured to transport one or more stored items within a tote to the order fulfillment collection zone.

In accordance with one or more aspects of the disclosed embodiment the collection tote location is dynamically variable based on a predetermined order characteristic.

In accordance with one or more aspects of the disclosed embodiment the storage management system is configured to change a status of the at least one human pick zone to at least one robotic pick zone, the system further comprising at least one robotic picker and the at least one robotic pick zone is arranged for robotic picker access to pick, or place, items from the fixed storage locations arrayed in the at least one robotic pick zone.

In accordance with one or more aspects of the disclosed embodiment a material handling system for a distribution center space includes a multiplicity of fixed production and/or storage locations distributed in the distribution center space in a predetermined ordered configuration and defining at least one human pick zone arranged for human picker access to pick, or place, items from the fixed production and/or storage locations arrayed in the at least one human pick zone, the fixed production and/or storage locations of each of the at least one human pick zone are integrally coupled to at least one collection tote location proximate each human pick zone; at least one autonomous mobile robot configured for holding and transporting a tote within the distribution center space and having an end effector arranged for autonomous transfer of the tote between the at least one autonomous mobile robot and a tote holding station and between the at least one autonomous mobile robot and a collection tote location; an order management system communicably connected to the at least one autonomous mobile robot and configured to associate each autonomous mobile robot of the at least one autonomous mobile robot with a human pick zone from more than one related human pick zones, of the at least one human pick zone, each of the related human pick zones has a stored item in the fixed production and/or storage locations, of the related human pick zone, corresponding to a pick order of the management system; wherein the at least one autonomous mobile robot is configured to transport the tote to the collection tote location of each associated human pick zone, and wherein each collection tote location is arranged for human picker access and defines an interface between a human picker in the human pick zone and the at least one autonomous mobile robot.

In accordance with one or more aspects of the disclosed embodiment the collection tote location is interposed between the at least one autonomous mobile robot and the fixed production and/or storage locations of the associated human pick zone.

In accordance with one or more aspects of the disclosed embodiment the collection tote location defines a tote interface between the at least one autonomous mobile robot and fixed production and/or storage locations of the associated human pick zone.

In accordance with one or more aspects of the disclosed embodiment each collection tote location has a tote support defining the tote holding station, the support being arranged so that the tote on the support is placed at an ergonomic height for the human picker.

In accordance with one or more aspects of the disclosed embodiment the collection tote location is coupled to fixed production and/or storage locations of the proximate human pick zone by a human picker.

In accordance with one or more aspects of the disclosed embodiment the related human pick zones form a path in the distribution center space connecting the collection tote locations that correspond to the store and/or customer pick order.

In accordance with one or more aspects of the disclosed embodiment the order management system directs the human picker at each of the related human pick zone respectively to fill a common tote at the collection tote location of the related human pick zone with an ordered stored item.

In accordance with one or more aspects of the disclosed embodiment the order management system directs the human picker to a respective collection tote location based on robot traverse status along the path.

In accordance with one or more aspects of the disclosed embodiment the at least one autonomous mobile robot is configured to transport the tote to each collection tote location along the path.

In accordance with one or more aspects of the disclosed embodiment the path is disposed in aisles formed between human pick zones, and human pickers and robots traversing the aisles along the path are comingled in the aisles.

In accordance with one or more aspects of the disclosed embodiment the system further includes a tote holding location that defines an order fulfillment collection zone, the at least one autonomous mobile robot being configured to transport one or more stored items within a tote to the order fulfillment collection zone.

In accordance with one or more aspects of the disclosed embodiment a method for operating a distribution center includes providing storage locations arranged in human pick zones each of which has at least one collection tote location; generating a schedule of human pickers in the human pick zones with a storage management system (MS), the schedule of human pickers corresponding to a pick order; defining, with the storage management system, a path connecting the human pick zones corresponding to the pick order; and routing, with the storage management system, at least one autonomous mobile robot to traverse the path to the at least one collection tote location of each corresponding human pick zone based on the schedule of human pickers.

In accordance with one or more aspects of the disclosed embodiment the method further includes transporting a common tote with the at least one autonomous mobile robot and associating, with the storage management system, the common tote with at least one corresponding order and a corresponding autonomous mobile robot so that the common tote is transported to each collection tote location by the a common autonomous mobile robot.

In accordance with one or more aspects of the disclosed embodiment the method further includes directing, with the storage management system, a human picker at each of the corresponding human pick zones to fill the common tote at the tote collection location with an ordered stored item.

In accordance with one or more aspects of the disclosed embodiment the method further includes associating, with the storage management system, the common tote with more than one corresponding order so that at least one cell of the common tote is associated with a different corresponding order from the more than one orders associated with the common tote.

In accordance with one or more aspects of the disclosed embodiment the method further includes associating, with the storage management system, a common tote with at least one corresponding store and/or customer pick order and transporting the common tote, with more than one autonomous mobile robot, to each collection tote location corresponding to the store and/or customer pick order.

It should be understood that the foregoing description is only illustrative of the aspects of the disclosed embodiment. Various alternatives and modifications can be devised by those skilled in the art without departing from the aspects of the disclosed embodiment. Accordingly, the aspects of the disclosed embodiment are intended to embrace all such alternatives, modifications and variances that fall within the scope of the appended claims. Further, the mere fact that different features are recited in mutually different dependent or independent claims does not indicate that a combination of these features cannot be advantageously used, such a combination remaining within the scope of the aspects of the invention.

What is claimed is:

1. A storage fill and retrieval system for a storage space, the system comprising:

a multiplicity of fixed storage locations distributed in the storage space in a predetermined ordered configuration and defining at least one human pick zone arranged for human picker access to the fixed storage locations arrayed in the at least one human pick zone so as to pick, or place, items from the fixed storage locations arrayed in the at least one human pick zone, each of the at least one human pick zones having at least one collection tote location;

at least one robot picker configured for holding and transporting a tote within the storage space and having an end effector arranged for autonomous transfer of the tote between the at least one robot picker and a tote holding station and between the at least one robot picker and the at least one collection tote location; and a storage management system communicably connected to the at least one robot picker and configured to associate each robot picker of the at least one robot pickers with a human pick zone from the at least one human pick zones, each of the related human pick zones having at least one stored item in the fixed storage locations, of the related human pick zone, corresponding to a store or customer pick order of the storage management system;

wherein the at least one robot picker is configured to transport the tote to the collection tote location of each associated human pick zone, and wherein each collection tote location is arranged for human picker access and defines an interface between a human picker in the human pick zone and the at least one robot picker.

2. The system of claim 1, wherein the storage management system includes a controller in communication with the human picker and the at least one robot picker, and configured so that the storage management system generates the interface between the human picker in the human pick zone and the at least one robot er and selectively determines if a state of the interface is a coupled interface or a decoupled interface.

3. The system of claim 2, wherein when the state of the interface is the coupled interface the human picker meets the at least one robot picker effecting a tote fill at the collection tote location.

4. The system of claim 2, wherein when the state of the interface is the decoupled interface, a tote fill at the collection tote location is effected without the human picker and the at least one robot picker meeting.

5. The system of claim 1, wherein the collection tote location of each human pick zone is positioned proximate to a side of the human pick zone providing access for the human picker to pick from the storage locations of the human pick zone.

6. The system of claim 1, further comprising a tote holding location that defines an order fulfillment collection zone, the at least one robot picker being configured to transport one or more stored items within a tote to the order fulfillment collection zone.

7. The system of claim 1, wherein the collection tote location is dynamically variable based on a predetermined order characteristic.

8. The system of claim 1, wherein the storage management system is configured to change a status of the at least one human pick zone to at least one robotic pick zone, the system further comprising at least one robotic picker and the at least one robotic pick zone is arranged for robotic picker access to pick, or place, items from the fixed storage locations arrayed in the at least one robotic pick zone.

9. A storage fill and retrieval system for a storage space, the system comprising:
a multiplicity of fixed storage locations distributed in the storage space in a predetermined ordered configuration and defining at least one human pick zone arranged for human picker access to the fixed storage locations arrayed in the at least one human pick zone so as to pick, or place, items from the fixed storage locations arrayed in the at least one human pick zone, each of the at least one human pick zones having at least one collection tote location;
at least one robot picker configured for holding and transporting a tote within the storage space and having an end effector arranged for autonomous transfer of the tote between the at least one robot picker and a tote holding station and between the at least one robot picker and at least one collection tote location; and
a storage management system communicably connected to the at least one robot picker and configured to associate each robot picker of the at least one robot pickers with a human pick zone from the at least one human pick zones, each of the related human pick zones having at least one stored item in the fixed storage locations, of the related human pick zone, corresponding to a store or customer pick order of the storage management system;
wherein the at least one robot picker is configured to transport the tote to the collection tote location of each associated human pick zone, and wherein each collection tote location is arranged for human picker access and defines an interface between a human picker in the human pick zone and the at least one robot picker; and
wherein the related human pick zones form a path in the store space connecting the collection tote locations that correspond to the store or customer pick order.

10. The system of claim 9, wherein the robot is configured to transport the tote to each collection tote location along the path.

11. The system of claim 10, wherein the robot transports a common tote to each collection tote location corresponding to the store and/or customer pick order.

12. The system of claim 11, wherein a common robot transports the common tote to each collection tote location corresponding to the store and/or customer pick order.

13. The system of claim 11, wherein more than one robot transports the common tote to each collection tote location corresponding to the store and/or customer pick order.

14. The system of claim 11, wherein the storage management system associates the common tote with at least one corresponding order and a corresponding robot so that the common tote is transported to each collection tote location by a common robot.

15. The system of claim 14, wherein the common tote is partitioned into more than one cell, the common tote being associated with more than one corresponding order and wherein the storage management system associates each cell with a different corresponding order from the more than one orders associated with the common tote.

16. The system of claim 11, wherein the storage management system associates the common tote with at least one corresponding store and/or customer pick order and the common tote is transported to each collection tote location corresponding to the store and/or customer pick order by more than one robot.

17. The system of claim 11, wherein the storage management system directs the human picker at each of the related human pick zone respectively to fill the common tote at the collection tote location of the related human pick zone with an ordered stored item.

18. The system of claim 17, wherein the storage management system directs the human picker to the respective collection tote location based on a robot traverse status along the path.

19. The system of claim 17, wherein the storage management system determines different traverse routes for the at least one robot picker to traverse the path, and wherein the management system selects a traverse route for the at least one robot picker based on a status of the human picker at one or more of the related human pick zones.

20. The system of claim 17, wherein the storage management system determines different traverse routes for the at least one robot picker to traverse the path, and wherein the storage management system selects a traverse route for the at least one robot picker based on a status of the human picker at one or more of the related human pick zones.

21. The system of claim 20, wherein the fixed storage locations are distributed along aisles and the at least one human pick zone is disposed in the aisles, the storage management system being configured to select aisles without human pickers located therein for the traverse routes.

22. The system of claim 20, wherein the fixed storage locations are distributed along aisles and the at least one human pick zone is disposed in the aisles, and a controller of the storage management system is configured to determine states of the at least one human pick zone without human pickers located therein, and set an aisle state for unrestricted traverse routes of the at least one robot picker.

23. The system of claim 20, wherein the fixed storage locations are distributed along aisles and the at least one human pick zone is disposed in the aisles, and the aisles have both human pick zones and bot traverse routes, the storage management system being configured to select a state of each aisle and change the state of the aisle from the at least one human pick zone to the bot traverse routes.

24. The system of claim 23, wherein the storage management system is configured to stop the at least one robot picker at an edge or side of the at least one human pick zone located in the aisle, where the at least one robot picker proceeds when the state of the aisle changes to a traverse route state.

25. The system of claim 23, wherein the storage management system is configured to stop the at least one robot picker at a collection tote location where the tote is located at an edge of the related human pick zone, where the at least one robot picker proceeds when the state of the aisle changes to a traverse route state.

26. The system of claim 20, wherein the fixed storage locations and the at least one human pick zone are disposed along aisles where the at least one human pick zone forms one side of a common aisle and the traverse route forms another side of the common aisle.

27. The system of claim 26, wherein the at least one human pick zone and the traverse route contiguously co-exist within the common aisle and the storage management system is configured to selectively switch locations of the at least one human pick zone and the traverse route within the common aisle.

28. A material handling system for a distribution center space, the system comprising:
 a multiplicity of fixed production or storage locations distributed in the distribution center space in a predetermined ordered configuration and defining at least one human pick zone arranged for human picker access to the fixed production or storage locations arrayed in the at least one human pick zone so as to pick, or place, items from the fixed production or storage locations arrayed in the at least one human pick zone, the fixed production and/or storage locations of each of the at least one human pick zone are integrally coupled to at least one collection tote location proximate each human pick zone;
 at least one robot picker configured for holding and transporting a tote within the distribution center space and having an end effector arranged for autonomous transfer of the tote between the at least one robot picker and a tote holding station and between the at least one robot picker and the at least one collection tote location; and
 an order management system communicably connected to the at least one robot picker and configured to associate each robot picker of the at least one robot picker with a human pick zone from more than one related human pick zones, of the at least one human pick zone, each of the related human pick zones has a stored item in the fixed production or storage locations, of the related human pick zone, corresponding to a pick order of the management system;
 wherein the at least one robot picker is configured to transport the tote to the collection tote location of each associated human pick zone, and wherein each collection tote location is arranged for human picker access and defines an interface between a human picker in the human pick zone and the at least one robot picker.

29. The system of claim 28, wherein the collection tote location is interposed between the at least one robot picker and the fixed production and/or storage locations of the associated human pick zone.

30. The system of claim 28, wherein the collection tote location defines a tote interface between the at least one robot picker and fixed production and/or storage locations of the associated human pick zone.

31. The system of claim 30, wherein each collection tote location has a tote support arranged so that the tote on the support may be placed at an ergonomic height for the human picker.

32. The system of claim 28, wherein the collection tote location is coupled to fixed production and/or storage locations of the proximate human pick zone by a human picker.

33. The system of claim 28, wherein the related human pick zones form a path in the distribution center space connecting the collection tote locations that correspond to the store and/or customer pick order.

34. The system of claim 33, wherein the path is disposed in aisles formed between human pick zones, and human pickers and robots traversing the aisles along the path are comingled in the aisles.

35. The system of claim 33, wherein the at least one robot picker is configured to transport the tote to each collection tote location along the path.

36. The system of claim 28, further comprising a tote holding location that defines an order fulfillment collection zone, the at least one robot picker being configured to transport one or more stored items within a tote to the order fulfillment collection zone.

37. The system of claim 33, wherein the order management system directs the human picker at each of the related human pick zone respectively to fill a common tote at the collection tote location of the related human pick zone with an ordered stored item.

38. The system of claim 37, wherein the order management system directs the human picker to a respective collection tote location based on robot traverse status along the path.

39. A method for operating a distribution center, the method comprising:
 providing storage locations arranged in human pick zones each of which has at least one collection tote location;
 generating a schedule of human pickers in the human pick zones with a storage management system (MS), the schedule of human pickers corresponding to a pick order;
 defining, with the storage management system, a path connecting the human pick zones corresponding to the pick order; and
 routing, with the storage management system, at least one robot picker to traverse the path to the at least one collection tote location of each corresponding human pick zone based on the schedule of human pickers.

40. The method of claim 39, further comprising transporting a common tote with the at least one robot picker and associating, with the storage management system, the common tote with at least one corresponding order and a corresponding robot picker so that the common tote is transported to each collection tote location by the corresponding robot picker.

41. The method claim 40, further comprising directing, with the storage management system, a human picker at each of the corresponding human pick zones to fill the common tote at each of the collection tote location with an ordered stored item.

42. The method of claim 40, further comprising associating, with the storage management system, the common tote with more than one corresponding order so that at least one cell of the common tote is associated with a different corresponding order from the more than one orders associated with the common tote.

43. The method of claim 40, further comprising associating, with the storage management system, a common tote with at least one corresponding store and/or customer pick order and transporting the common tote, with more than one robot picker, to each collection tote location corresponding to the store and/or customer pick order.

* * * * *

UNITED STATES PATENT AND TRADEMARK OFFICE
CERTIFICATE OF CORRECTION

PATENT NO. : 9,694,977 B2  Page 1 of 1
APPLICATION NO. : 14/883310
DATED : July 4, 2017
INVENTOR(S) : Aprea et al.

It is certified that error appears in the above-identified patent and that said Letters Patent is hereby corrected as shown below:

In the Claims

Column 23, Claim 2, Line 8, delete "er" and insert --picker-- therefor.

Signed and Sealed this
Twelfth Day of September, 2017

Joseph Matal
*Performing the Functions and Duties of the*
*Under Secretary of Commerce for Intellectual Property and*
*Director of the United States Patent and Trademark Office*